(12) United States Patent
Matsumura et al.

(10) Patent No.: US 11,089,597 B2
(45) Date of Patent: Aug. 10, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/488,270

(22) PCT Filed: Feb. 23, 2018

(86) PCT No.: PCT/JP2018/006610
§ 371 (c)(1),
(2) Date: Aug. 23, 2019

(87) PCT Pub. No.: WO2018/155605
PCT Pub. Date: Aug. 30, 2018

(65) Prior Publication Data
US 2020/0008204 A1    Jan. 2, 2020

(30) Foreign Application Priority Data
Feb. 24, 2017   (JP) .............................. JP2017-033356

(51) Int. Cl.
*H04W 72/04*   (2009.01)
*H04J 13/18*   (2011.01)
(Continued)

(52) U.S. Cl.
CPC ......... *H04W 72/0466* (2013.01); *H04J 13/18* (2013.01); *H04L 5/0051* (2013.01); *H04L 5/0094* (2013.01); *H04L 27/2607* (2013.01)

(58) Field of Classification Search
CPC ... H04W 72/0466; H04J 13/18; H04L 5/0051; H04L 5/0094; H04L 27/2607
See application file for complete search history.

(56) References Cited

U.S. PATENT DOCUMENTS

| | | | | |
|---|---|---|---|---|
| 2008/0316961 | A1* | 12/2008 | Bertrand | H04L 5/0051 370/329 |
| 2009/0073944 | A1* | 3/2009 | Jiang | H04J 11/00 370/338 |

(Continued)

FOREIGN PATENT DOCUMENTS

| | | |
|---|---|---|
| JP | 2011040841 A | 2/2011 |
| WO | 2016106496 A1 | 7/2016 |

OTHER PUBLICATIONS

Akimoto Yosuke, "Wireless communication system, base station apparatus, and mobile station device", Feb. 14, 2011, JP, JP 2011-40841 A, English machine language translation. (Year: 2011).*

(Continued)

*Primary Examiner* — Paul H Masur
*Assistant Examiner* — Michael K Phillips
(74) *Attorney, Agent, or Firm* — Osha Bergman Watanabe & Burton LLP

(57) ABSTRACT

The present invention is designed so that communication is performed properly when contention-based UL transmission is used. A user terminal has a transmission section that transmits a first reference signal and a UL data signal, without a UL transmission indication from a radio base station, and a control section that controls generation of the first reference signal by using code resource associated with the user terminal, and the control section controls generation of the first reference signal by using more code resources than code resources that can be used for a second reference signal that is transmitted with the UL data signal in response to the UL transmission indication.

6 Claims, 17 Drawing Sheets

(51) Int. Cl.
*H04L 5/00* (2006.01)
*H04L 27/26* (2006.01)

(56) References Cited

U.S. PATENT DOCUMENTS

| | | | | |
|---|---|---|---|---|
| 2010/0105405 | A1* | 4/2010 | Vujcic | H04L 5/0053 455/452.1 |
| 2014/0233379 | A1* | 8/2014 | Chu | H04W 28/0289 370/230 |
| 2015/0189645 | A1* | 7/2015 | Maeda | H04L 1/1858 370/336 |
| 2016/0192398 | A1 | 6/2016 | Wang et al. | |
| 2017/0026792 | A1* | 1/2017 | Singh | H04W 74/002 |
| 2017/0164350 | A1* | 6/2017 | Sun | H04L 5/0007 |
| 2017/0295596 | A1* | 10/2017 | Chen | H04L 5/0053 |
| 2017/0367120 | A1* | 12/2017 | Murray | H04B 7/0695 |
| 2018/0054800 | A1* | 2/2018 | Yeo | H04W 72/08 |
| 2018/0213484 | A1* | 7/2018 | Oh | H04W 52/42 |
| 2019/0223157 | A1* | 7/2019 | Hwang | H04L 27/2602 |
| 2020/0083947 | A1* | 3/2020 | Islam | H04B 7/0695 |
| 2020/0099499 | A1* | 3/2020 | Yeo | H04L 1/0009 |
| 2020/0169994 | A1* | 5/2020 | Papasakellariou | H04W 52/281 |

OTHER PUBLICATIONS

Written Opinion issued by International Application No. PCT/JP2018/006610; dated May 15, 2018, English translation. (Year: 2018).*
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010, (149 pages).
NTT DOCOMO, Inc.; "On UL grant free for URLLC"; 3GPP TSG RAN WG1 Meeting #88, R1-1702819; Athens, Greece, Feb. 13-17, 2017 (3 pages).
International Search Report issued in International Application No. PCT/JP2018/006610, dated May 15, 2018 (5 pages).
Written Opinion issued in International Application No. PCT/JP2018/006610; dated May 15, 2018 (4 pages).

* cited by examiner

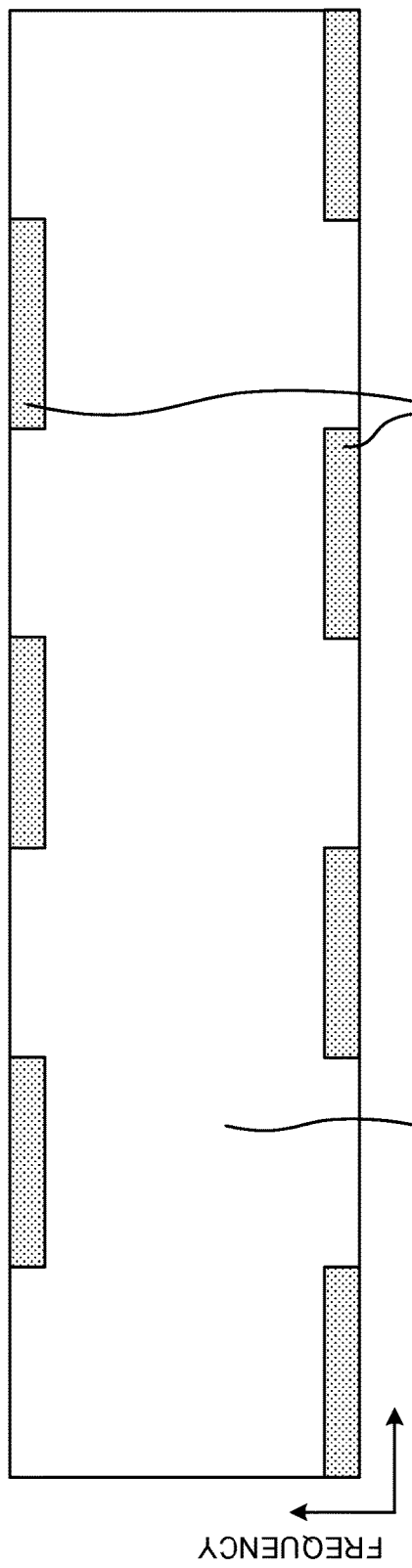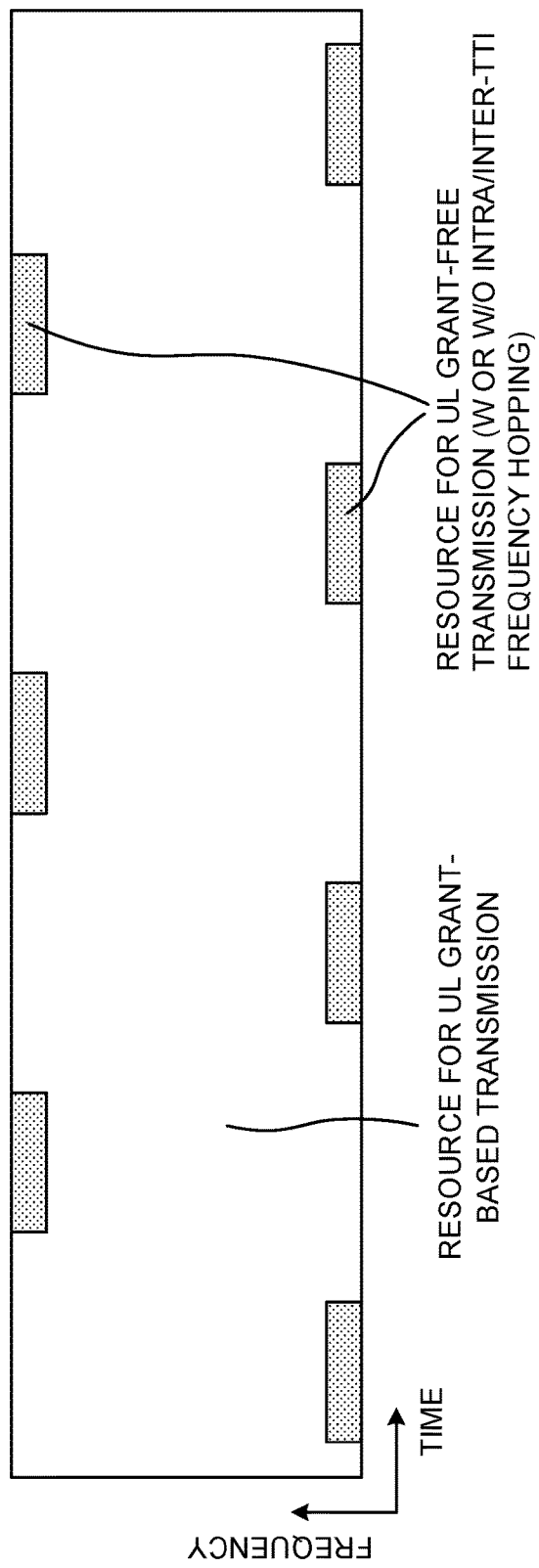

CHANNEL CONFIGURATION FOR UL GRANT-BASED TRANSMISSION

CHANNEL CONFIGURATION FOR UL GRANT-FREE TRANSMISSION

CHANNEL CONFIGURATION FOR UL GRANT-BASED TRANSMISSION

CHANNEL CONFIGURATION FOR UL GRANT-FREE TRANSMISSION

UL DATA

REFERENCE SIGNAL

CHANNEL CONFIGURATION FOR UL GRANT-BASED TRANSMISSION

CHANNEL CONFIGURATION FOR UL GRANT-BASED TRANSMISSION

CHANNEL CONFIGURATION FOR UL GRANT-FREE TRANSMISSION

CHANNEL CONFIGURATION FOR UL GRANT-FREE TRANSMISSION

CHANNEL CONFIGURATION FOR UL GRANT-BASED TRANSMISSION

CHANNEL CONFIGURATION FOR UL GRANT-BASED TRANSMISSION

CHANNEL CONFIGURATION FOR UL GRANT-FREE TRANSMISSION

CHANNEL CONFIGURATION FOR UL GRANT-FREE TRANSMISSION

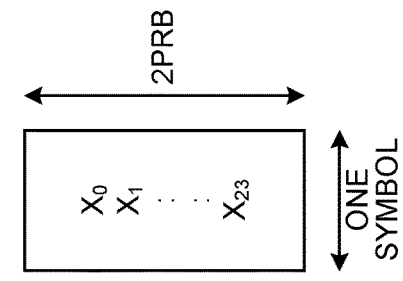
FIG. 7A
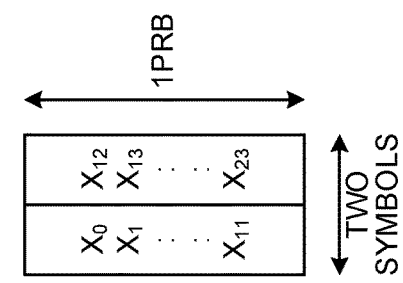
FIG. 7B
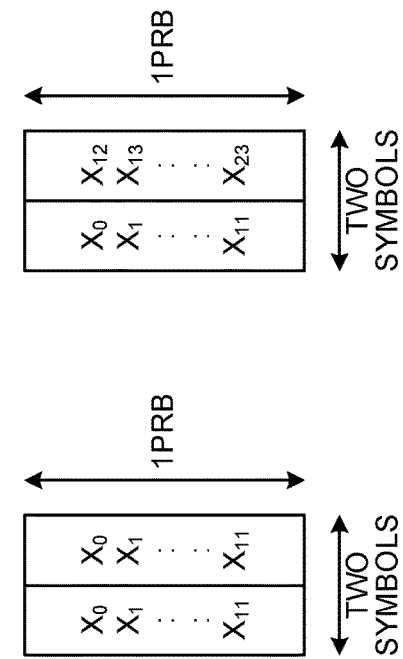
FIG. 7D
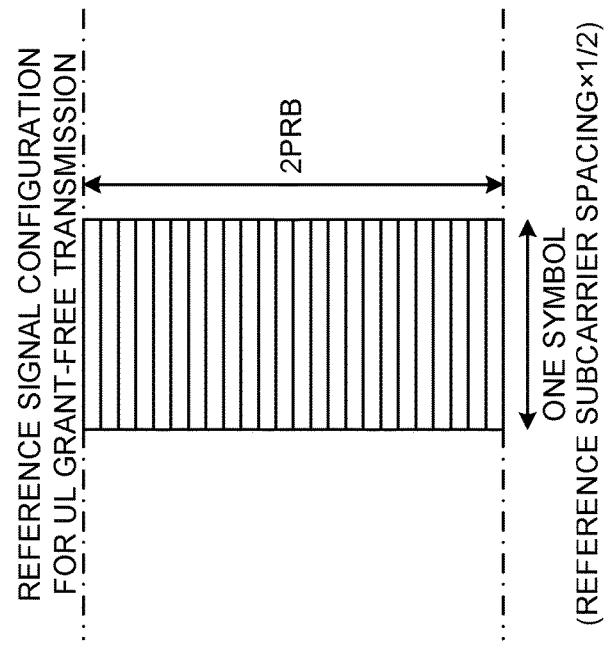
FIG. 7C REFERENCE SIGNAL CONFIGURATION FOR UL GRANT-BASED TRANSMISSION
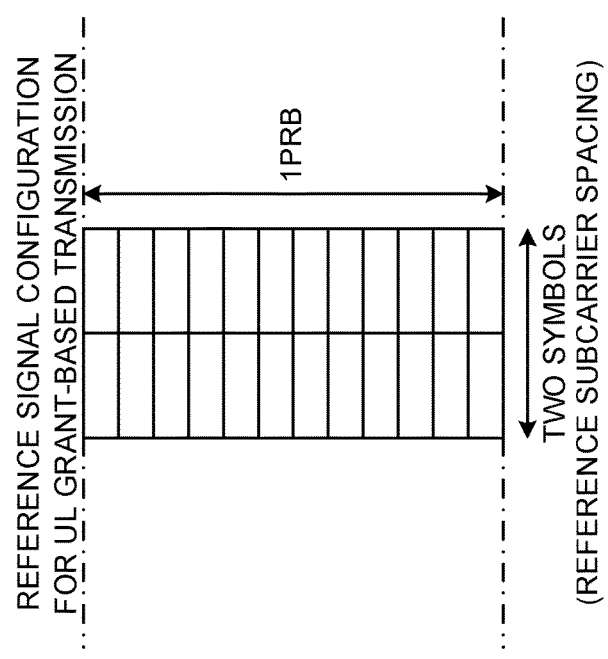
FIG. 7E REFERENCE SIGNAL CONFIGURATION FOR UL GRANT-FREE TRANSMISSION

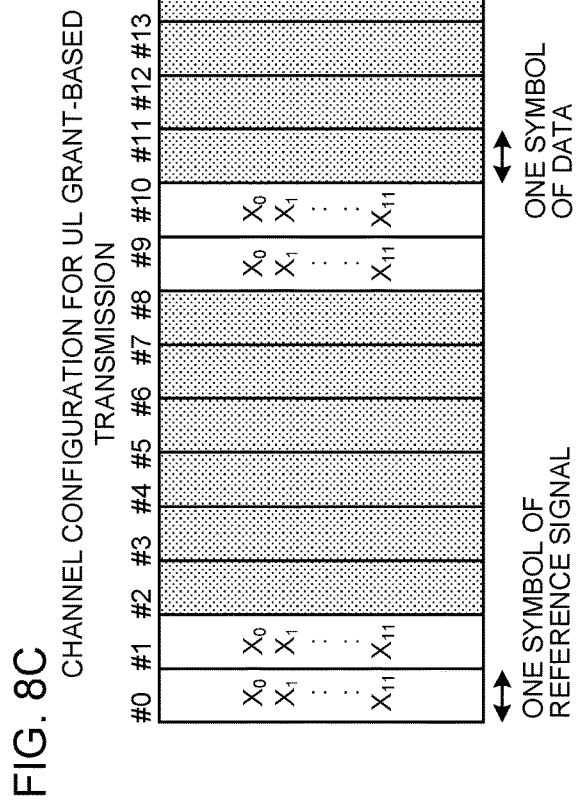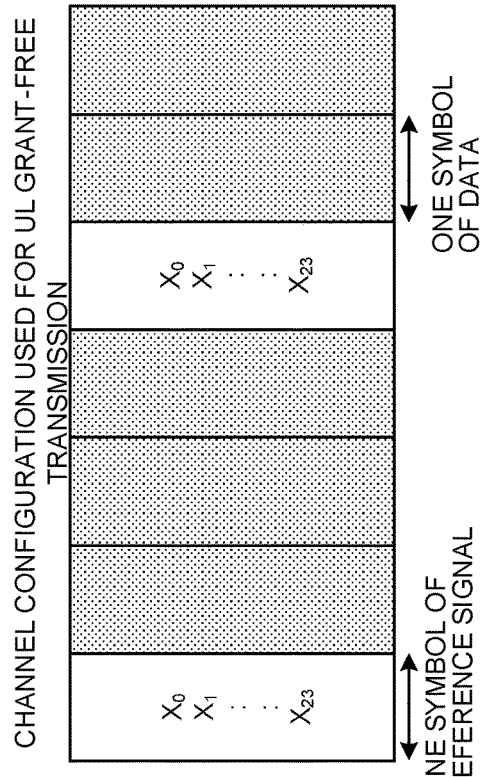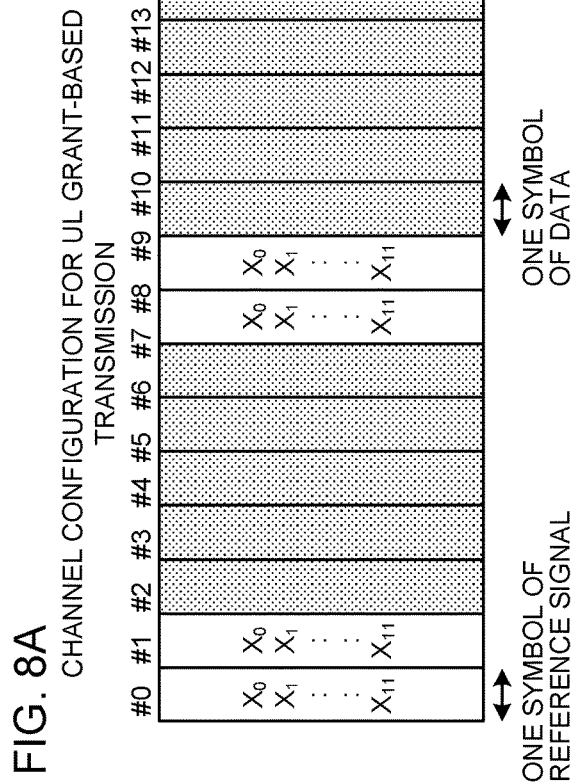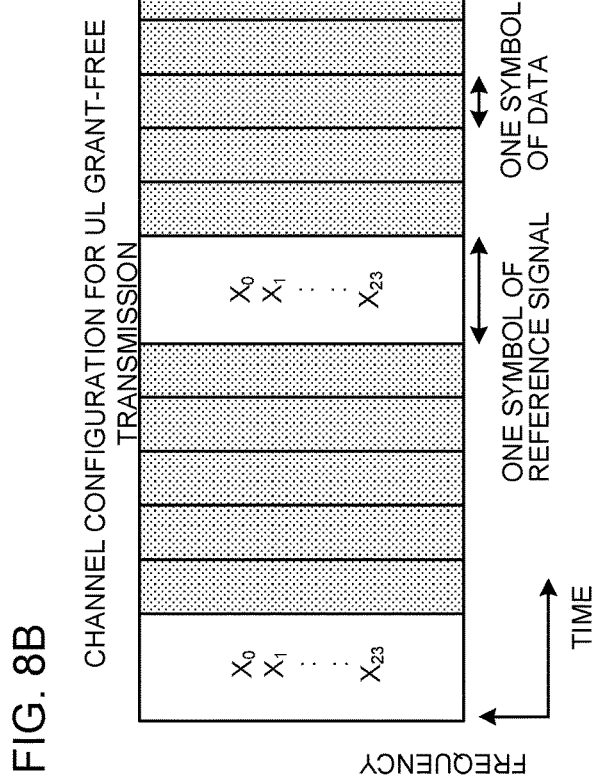

ASSIGN CYCLIC SHIFT FOR UL GRANT-FREE TRANSMISSION

ASSIGN CYCLIC SHIFT FOR UL GRANT-BASED TRANSMISSION

● CYCLIC SHIFT ASSIGNED TO USER TERMINAL
○ CYCLIC SHIFT NOT ASSIGNED TO USER TERMINAL

USER TERMINAL AND RADIO COMMUNICATION METHOD

CROSS-REFERENCE TO RELATED APPLICATIONS

This application is a national phase application of PCT/JP2018/006610, filed on Feb. 23, 2018, which claims priority to Japanese Patent Application No. 2017-033356, filed on Feb. 24, 2017. The contents of these applications are hereby incorporated by reference in their entirety.

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10," "LTE Rel. 11," "LTE Rel. 12," etc.) have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "Nx (New radio access)," "FX (Future generation radio access)," "LTE Rel. 13," "LTE Rel. 14" or "LTE. Rel. 15" and so on) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

A radio base station controls allocation (scheduling) of data for a user terminal, and reports the schedule of data to the user terminal (for example UE: User Equipment) using downlink control information (DCI). The user terminal controls receipt of DL data and transmission of uplink data based on the downlink control information. For example, in existing LTE systems, when a user terminal receives downlink control information that indicates UL transmission (for example, a UL grant), after a predetermined period (for example, 4 ms later), the user terminal transmits uplink data in a predetermined subframe.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," March, 2010.

SUMMARY OF INVENTION

Technical Problem

Future radio communication systems (for example, LTE Rel. 14, 15 or later versions, 5G, NR, etc.) are assumed to control data scheduling based on different configurations than existing LTE systems (for example, LTE Rel. 13 or earlier versions). For example, in order to provide communication services that require low latency and high reliability (for example, URLLC (Ultra Reliable and Low Latency Communications)), research is underway to reduce communication latency (latency reduction).

To be more specific, in order to reduce the latency time before UL data transmission starts, study is in progress to perform communication by permitting collisions of UL transmissions among a plurality of user terminals. For example, study is underway to allow user terminals to transmit UL data without UL grants from radio base stations (also referred to as "UL grant-free UL transmission," "UL grant-less UL transmission," "contention-based UL transmission," "UL grant-less and contention-based UL transmission," and so on).

However, what kind of control is executed when user terminals adopt contention-based UL transmission and transmit UL data is not decided yet, and it is difficult to apply methods for existing LTE systems that are premised on UL grant-based UL transmission.

The present invention has been made in view of the above, and it is therefore an object of the present invention to provide a user terminal and a radio communication method, whereby adequate communication can be performed when contention-based UL transmission is employed.

Solution to Problem

According to one aspect of the present invention, a user terminal has a transmission section that transmits a first reference signal and a UL data signal, without a UL transmission indication from a radio base station, and a control section that controls generation of the first reference signal by using code resource associated with the user terminal, and the control section controls generation of the first reference signal by using more code resources than code resources that can be used for a second reference signal that is transmitted with the UL data signal in response to the UL transmission indication.

Advantageous Effects of Invention

According to the present invention, when contention-based UL transmission is applied, communication can be performed adequately.

BRIEF DESCRIPTION OF DRAWINGS

FIGS. 3A and 3B are diagrams to show examples of resources for use for UL grant-free transmission;

FIGS. 7A to 7E are diagrams to show examples of reference signal configurations for UL grant-based transmission and examples of reference signal configurations for UL grant-free transmission, where the subcarrier spacing is switched;

FIGS. 8A to 8D are diagrams to show examples of channel configurations for UL grant-based transmission and examples of channel configuration for UL grant-free transmission, where the subcarrier spacing is switched;

DESCRIPTION OF EMBODIMENTS

Future radio communication systems are expected to accommodate various services such as high-speed and large-capacity communication (eMBB: enhanced Mobile Broad Band), massive access (mMTC: massive MTC) from devices (user terminals) for inter-device communication (M2M: Machine-to-Machine) such as IoT (Internet of Things) and MTC (Machine Type Communication), low-latency and high-reliability communication (URLLC: Ultra-Reliable and Low Latency Communication), in a single framework.

To fulfill the demand of URLLC, it may be necessary, for example, to keep the delay on the U-plane 0.5 ms or less, and transmit information of a predetermined payload size with reliability of BLER (Block Error Rate)=$10^{-5}$, within 0.5 ms or 1 ms.

Figure 1A:
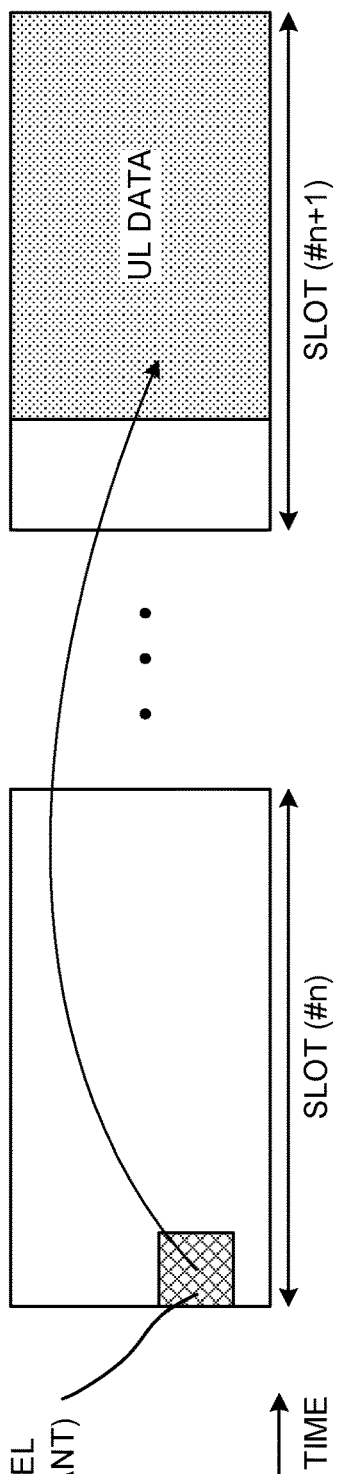
FIG. 1A is a diagram to explain UL grant-based transmission.
Figure 1B:
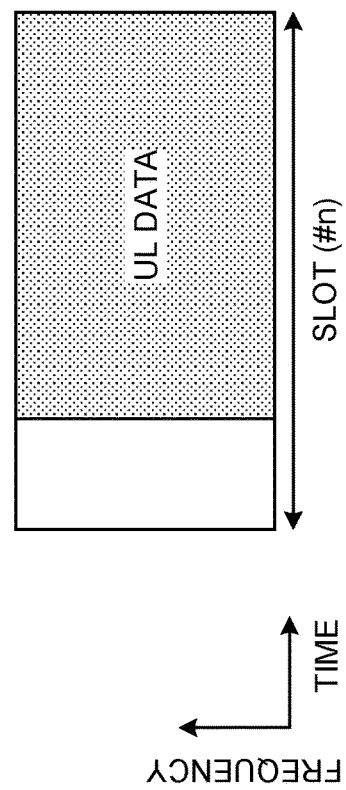
FIG. 1B is a diagram to explain UL grant-free transmission.

To fulfill the demand of URLLC, UL grant-based transmission, in which UL data is transmitted based on UL grants, is not enough, and it is necessary to employ UL grant-free transmission, in which UL data is transmitted without UL grants. Here, UL grant-based transmission and UL grant-free transmission will be explained. FIG. 1A is a diagram to explain UL grant-based transmission, and FIG. 1B is a diagram to explain UL grant-free transmission.

In UL grant-based transmission, as shown in FIG. 1A, a radio base station transmits a downlink control channel (UL grant), which indicates allocation of UL data (PUSCH), and a user terminal transmits UL data in accordance with the UL grant. Meanwhile, in UL grant-free transmission, as shown in FIG. 1B, a user terminal transmits UL data without receiving UL grants for data scheduling.

However, when UL data is transmitted by applying UL grant-free transmission, what kind of control is to be executed is the problem. For example, while, in existing LTE systems, a radio base station can dynamically allocate resources for use for UL data transmission by using UL grants, in UL grant-free transmission, the radio base station cannot dynamically allocate resources for use for UL data transmission. Therefore, how to control resource fields for UL grant-free transmission is the problem.

The present inventors have focused on the fact that, from the perspective of avoiding collisions between UL data in UL grant-free transmission and UL data in UL grant-based transmission, it is preferable to separate between resource fields for UL grant-free transmission and resource fields for UL grant-based transmission. Consequently, the present inventors have arrived at pre-configuring resource fields (reserved resources) for allocating UL data to be sent in UL grant-free transmission, and controlling assignment of UL grant-free transmission. For example, resources for use for UL grant-free transmission may be configured as in UL semi-persistent scheduling (SPS). Also, the radio base station may select resources for use in UL grant-based transmission, and then configure resources for UL grant-free transmission from the remaining resources. The reserved resource may be time resources and/or frequency resources.

Figure 2:
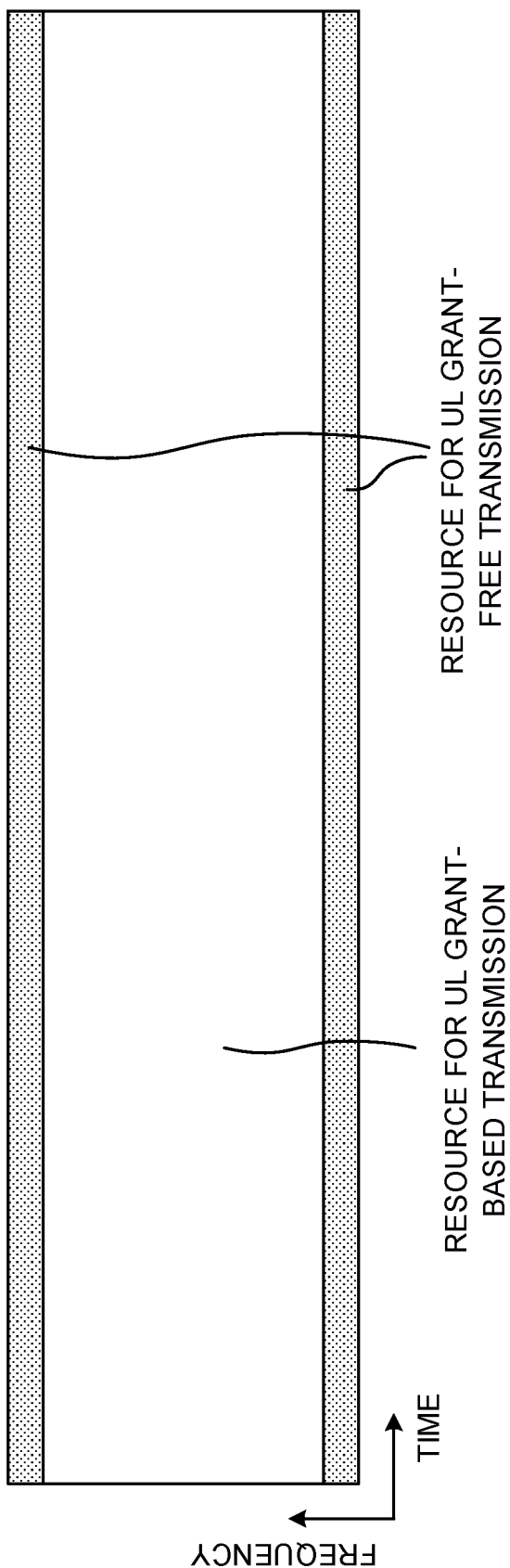
FIG. 2 is a diagram to show examples of resources for use for UL grant-free transmission.

FIG. 2 is a diagram to show example of resources for use for UL grant-free transmission. In the resource configuration shown in FIG. 2, a frequency resource for use for UL grant-based transmission is provided between two frequency resources for use for UL grant-free transmission. The resources for use for UL grant-free transmission are provided over all time. As shown in FIG. 2, by discretely configuring the frequency resources for use for UL grant-free transmission, when there is no response from the radio base station after UL grant-free transmission and UL grant-free transmission is performed again, when new data is transmitted in UL grant-free transmission after UL grant-free transmission, a frequency diversity effect can be anticipated by performing UL grant-free transmission using different frequencies.

FIGS. 3A and 3B are diagrams to show examples of resources for use for UL grant-free transmission. Also, in the resource configuration shown in FIG. 3A, frequency resources for use for UL grant-based transmission are provided between two frequency resources for use for UL grant-free transmission. Resources for use for UL grant-free transmission are alternately provided in two frequency resources. One frequency resource is configured intermittently in time, and the other frequency resource is always configured at the time when one frequency resource is not configured. Therefore, resources are provided for UL grant-free transmission over the entire time. In the resource configuration shown in FIG. 3A, inter-TTI frequency hopping or intra-TTI frequency hopping may be used.

Also in the resource configuration shown in FIG. 3B, a frequency resource for use for UL grant-based transmission is provided between two frequency resources for use for UL grant-free transmission. The resources for use for UL grant-free transmission are configured alternately in time, intermittently, in two frequency resources. In this resource configuration, there are times where resources for use for UL grant-free transmission are not provided.

The transmission bandwidths shown in FIG. 2 and FIG. 3 may be, for example, a system bandwidth or a fundamental frequency block bandwidth, and include a plurality of PRBs (Physical Resource Blocks). In FIG. 2 and FIG. 3, the bandwidth of frequency resources for use for UL grant-based transmission is part or whole of the transmission bandwidth, and the bandwidth for frequency resources for use for UL grant-free transmission is a part of the transmission bandwidth.

When user terminals transmit UL data by applying UL grant-free transmission, it might occur that a plurality of pieces of UL data that are allocated to the same resource collide with each other, and the radio base station is unable to receive the UL data properly. In this case, although a retransmission indication or the like may be reported from the radio base station side to the user terminals so as to have UL data retransmitted, the problem is how to identify (find, discover, etc.) the user terminals that have transmitted the UL data, on the radio base station side.

Therefore, for the purpose of identifying user terminals that have transmitted UL data, on the radio base station side, the present inventors have focused on reference signals that are transmitted simultaneously with UL data. These reference signals may include reference signals for demodulation, preambles for signal discovery, and so on. That is, with embodiments of the present invention, user terminals that have transmitted UL data are identified by using reference signals, instead of using data that is more likely to collide. The reason is that reference signals, which can be multiplexed between user terminals, can be received at the radio base station side even when UL data collides. Therefore, embodiments of the present invention are configured so that user terminals can be identified by using reference signals.

User terminals perform UL grant-free transmission using a part of the reserved resources. Based on blind detection and/or DTX (Discontinuous Transmission) detection of reference signals in the reserved resources, the radio base station detects UL grant-free transmission. The reference signals provide identification information as to which user terminals have performed the UL grant-free transmission.

If the radio base station identifies a user terminal based on the reference signals and decodes data properly, the radio base station schedules (indicates UL grant-based transmission) subsequent UL data for the identified user terminal, with a UL grant. If the radio base station identifies a user terminal based on reference signals and fails to decode data, the radio base station schedules (indicates UL grant-based transmission) retransmission, with a UL grant, for the identified user terminal. Even if decoding of data fails, identification of a user terminal will succeed with a high probability as long as reference signals do not collide. If the radio base station fails to decode data and to identify a user terminal, the user terminal retransmits data without a UL grant, in UL grant-free transmission, after confirming DTX of a grant.

In this way, in the event UL grant-free transmission is received and the user terminal is identified based on reference signals, it is preferable if the user terminal performs transmission of new UL data when UL data is properly decoded, and retransmission of UL data when UL data is not properly decoded, by way of UL grant-based transmission. This is because, in UL grant-free transmission, the efficiency of the use of resources is low compared to UL grant-based transmission.

Failure to identify user terminals is crucial in light of the latency requirements in URLLC. Also, the identification of user terminals based on reference signals needs to be robust against congestion and/or interference.

Reserved resources for UL grant-free transmission are configured in a user terminal. In addition to reserved resources, information for UL grant-free transmission, including sequence numbers to indicate base sequences of reference signals (PN (Pseudo-Noise) sequences, CAZAC (Constant Amplitude Zero Auto Correlation) sequences, etc.), cyclic shift numbers to indicate the cyclic shifts of base sequences (phase rotation amounts), code numbers to indicate the codes multiplied on base sequences, the amount of reference signal resources (for example, the number of symbols of reference signals within a TTI) and so on, is configured in the user terminal. At least one of the base sequences of a reference signal, the cyclic shift of the base sequence, and the code multiplied on the base sequence is referred to as "code resource."

Such information for reserved resources and/or UL grant-free transmission may be configured (reported) from the network (for example, a radio base station) to a user terminal via higher layer signaling (for example, RRC (Radio Resource Control) signaling, MAC (Medium Access Control) signaling, broadcast information (MIB (Master Information Block), SIBs (System Information Blocks), etc.), physical layer signaling (for example, downlink control information (DCI)), or a combination thereof.

The user terminal may obtain code resources from information such as UE-ID, PCID (Physical Cell Identifier), VCID (Virtual Cell ID), beam ID, etc., configured for use other than UL grant-free transmission. Also, the radio base station may be configured to assign specific HARQ process IDs to UL grant-free transmission, and schedule UL grant-based transmission using other HARQ process IDs. In this way, a user terminal determines reference signal code resources based on information configured for use other than UL grant-free transmission, so that the amount of information that is reported from the network to the user terminal can be reduced.

For each user terminal where UL grant-free transmission is configured, a dedicated reference signal sequence/code is configured. In order to prevent collisions of reference signals, it is necessary to prepare a large number of reference signals. That is, by expanding the capacity and reliability of reference signals, it becomes possible to identify user terminals based on reference signals.

In order to increase the number of user terminals that can be identified in UL grant-free transmission, it is effective to increase the mutual orthogonality of reference signals (the number of reference signals that can be multiplexed). In the event reference signals are configured so that user terminals can identify them, increasing the number of reference signals in the frequency domain so to increase the orthogonality of reference signals (the number of reference signals that can be multiplexed) may lead to reducing the resources that can be used for other services, UL data transmission based on UL grants, and so on. For example, when a user terminal that is capable of UL grant-free transmission and a user terminal to which an eMBB cannot apply UL grant-free transmission and applies UL grant-based transmission are co-present, it is not preferable to increase reference signals in the frequency domain.

So, the present inventors have come up with the idea of using a signal configuration that increases reference signals in the time domain and/or the code domain. Increasing reference signals in the time domain can be said to increase the amount of time resources for use for reference signals. Increasing reference signals in the code domain can also be said to increase the amount of code resources for use for reference signals.

As a result, it is possible to allocate more resources to reference signals for UL grant-free transmission than resources that can be allocated to reference signals for UL grant-based transmission. Then, the number of user terminals that can be identified in UL grant-free transmission can be increased.

Now, embodiments of the present invention will be described in detail below with reference to the accompanying drawings. Note that the radio communication methods according to the herein-contained embodiments may be used individually or may be used in combination.

Radio Communication Method

First Embodiment

According to the first aspect of the present invention, resources for reference signals for UL grant-free transmission is increased in the time domain and/or the code domain.

A channel configuration for use in UL grant-free transmission to increase the number of user terminals to be identified in UL grant-free transmission will be described. In this channel configuration, more reference signals are arranged than reference signals in a channel configuration for use in UL grant-based transmission. In this case, if reference signals are increased in the frequency direction, resources that can be used for other services and UL grant-based UL data transmission are reduced, so that a configuration (channel configuration) that increases reference signals in the time direction is adopted.

Figure 4A:
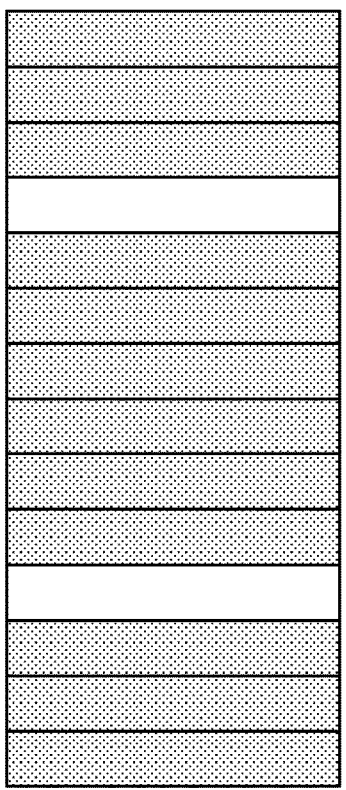
FIGS. 4A to 4D are diagrams to show an example of a channel configuration for UL grant-based transmission and an example of a channel configuration for UL grant-free transmission.
Figure 4B:
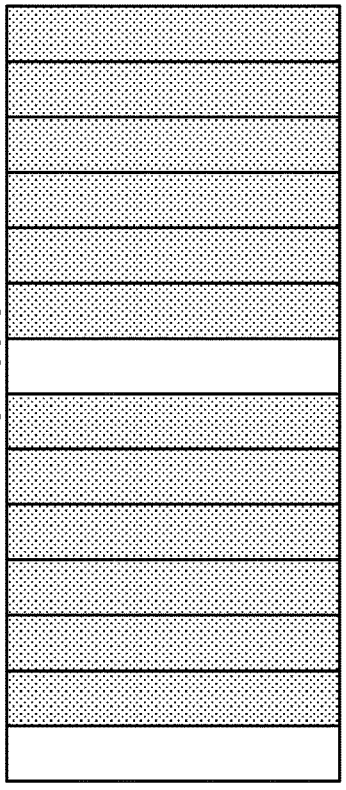

FIGS. 4A and 4B are diagrams to show an example of a channel configuration for UL grant-based transmission and an example of a channel configuration for UL grant-free transmission, respectively. The channel configuration of FIG. 4A is a channel configuration for use in UL grant-based transmission, and reference signals (RSs) are provided in two symbols in one slot (or one subframe). Meanwhile, the channel configuration in FIG. 4B is a channel configuration for use in UL grant-free transmission, and reference signals (RSs) are provided in six symbols, consecutively, in one slot (or one subframe).

Looking at the channel configuration of FIG. 4A as a base, the channel configuration of FIG. 4B adds two symbols to the channel configuration of FIG. 4A. This minimizes the difference between the channel configuration for UL grant-free transmission and the channel configuration for UL grant-based transmission, so that, in the radio base station, a common channel estimation algorithm can be used.

Figure 4C:
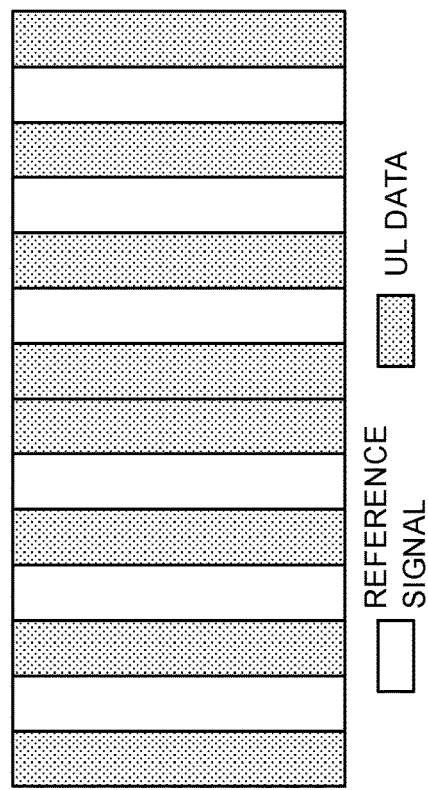
Figure 4D:
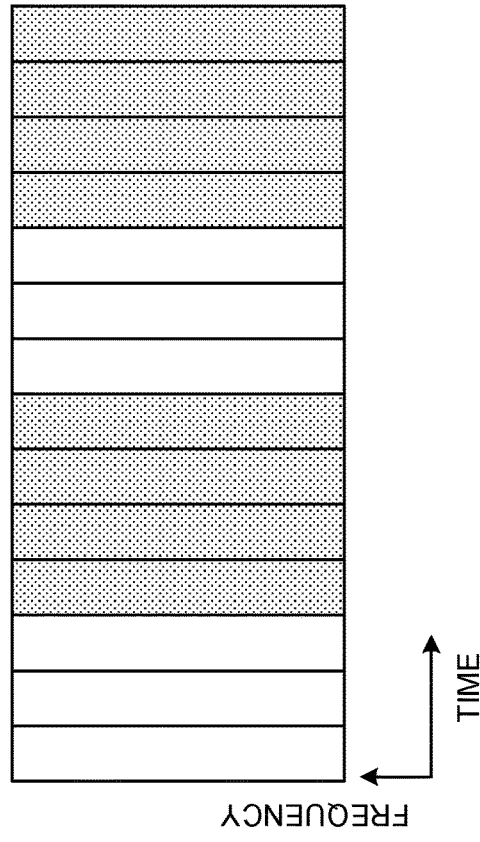
Figure 5A:
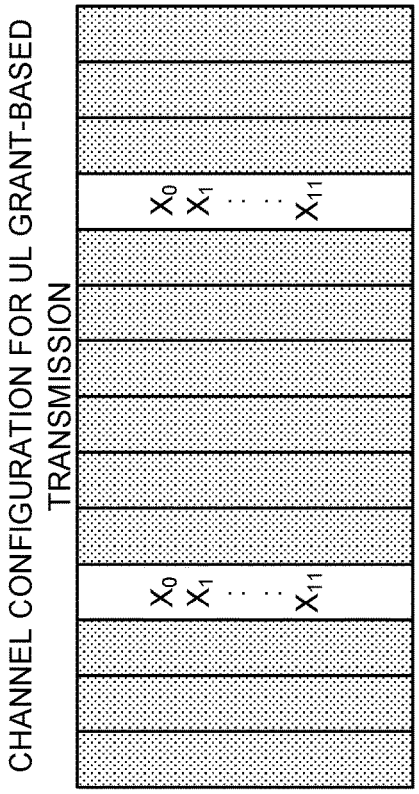
FIGS. 5A to 5D are diagrams to show examples of the reference signal sequences of FIGS. 4A to 4D, respectively.
Figure 5C:
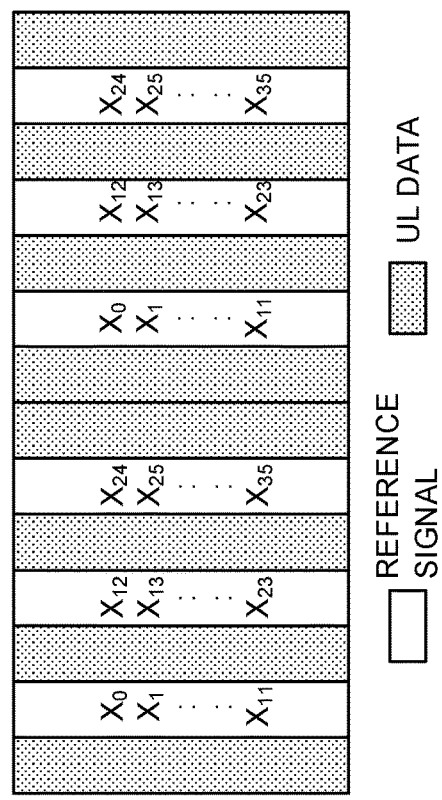
Figure 5B:
Figure 5D:
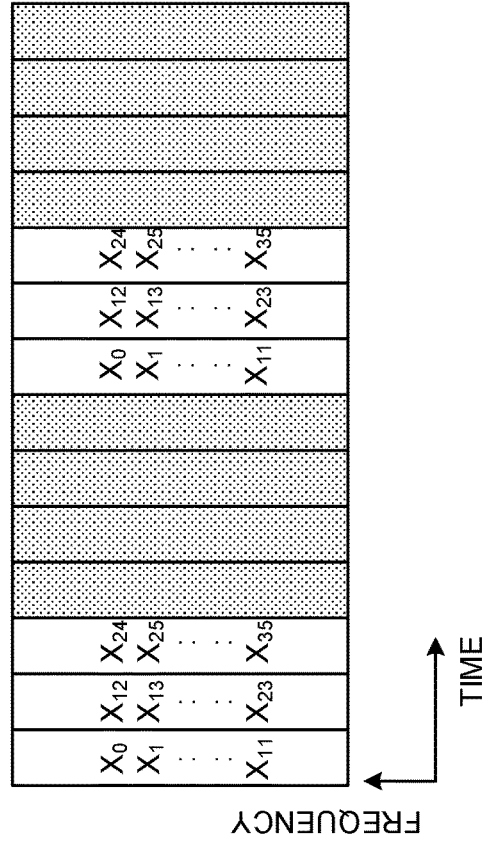
Figure 6A:
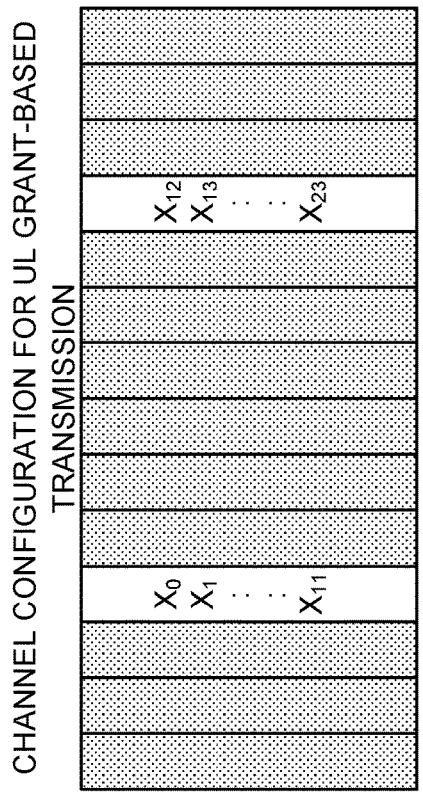
FIGS. 6A to 6D are diagrams to show other example of the reference signal sequences of FIGS. 4A to 4D, respectively.
Figure 6C:
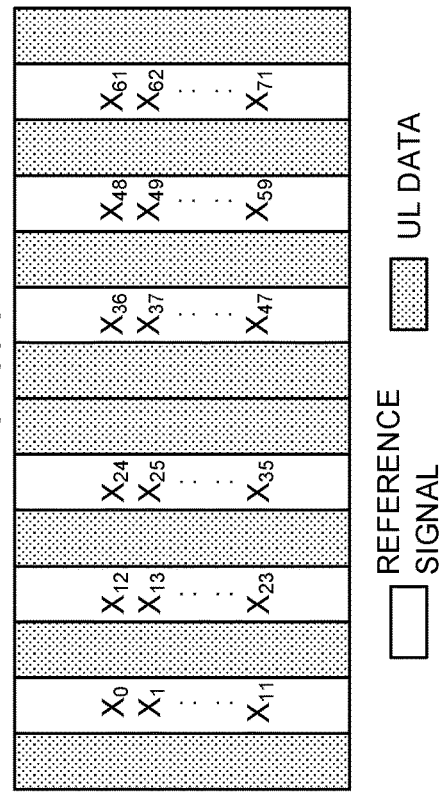
Figure 6B:
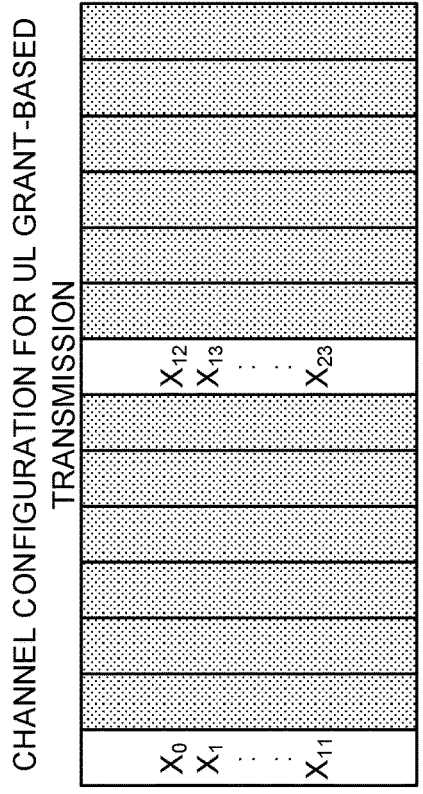
Figure 6D:
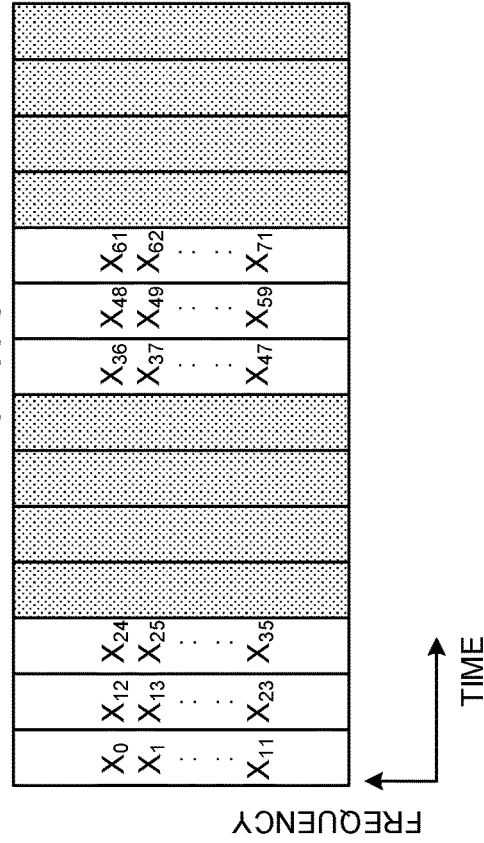

FIGS. 4C and 4D are diagrams, illustrating another example of a channel configuration for UL grant-based transmission and another example of a channel configuration for UL grant-free transmission, respectively.

The channel configuration of FIG. 4C is a channel configuration for use in UL grant-based transmission, and reference signals (RSs) are provided in two symbols within one slot. Meanwhile, the channel configuration of FIG. 4D is a channel configuration for use in UL grant-free transmission, and reference signals (RSs) are provided in six symbols (intermittently) in one slot. In this way, by adopting a configuration (channel configuration) that increases reference signals in the time direction, detection at the radio base station can be facilitated and user can be identified with high accuracy.

Based on the channel configuration of FIG. 4C, the channel configuration of FIG. 4D adds two symbols to the channel configuration of FIG. 4C. This minimizes the difference between the channel configuration for UL grant-free transmission and the channel configuration for UL grant-based transmission, so that, in the radio base station, a common channel estimation algorithm can be used.

The channel configurations for UL grant-based transmission in FIGS. 4A and 4C can be applied to the resources for UL grant-based transmission in FIG. 2 and FIG. 3. The channel configurations for UL grant-free transmission in FIGS. 4B and 4D can be applied to the resources for UL grant-free transmission in FIG. 2 and FIG. 3.

The user terminal transmits data using different channel configurations, depending on whether the UL data to be transmitted is transmitted in UL grant-based transmission or in UL grant-free transmission. In the event of UL grant-based transmission, the user terminal transmits UL data in a configuration with few reference signals, so that it is possible to reduce the overhead and improve the data rate.

Next, how to increase code resources that can be used for the UL grant-free transmission reference code will be described.

Base sequences to be used for reference signals may be CAZAC (Constant Amplitude Zero Auto-Correlation) sequences (for example, Zadoff-Chu sequences), and or may be sequences conforming to CAZAC sequences, such as ones that are specified in 3GPP TS 36.211 § 5.5.1.2 (in particular, Table 5.5.1.2-1 and Table 5.5.1.2-2) and so on (CG-CAZAC (Computer-Generated CAZAC) sequences).

It is desirable to use a base sequence having a long sequence length in UL grant-free transmission. When base sequences have a longer sequence length, the number of base sequences that are orthogonal to each other increases. For example, the number of sequences in Zadoff-Chu sequences is the largest prime number less than or equal to the sequence length minus one. Also, the number of cyclic shifts (amounts of phase rotation) that can be used is the number of multiple sequences, obtained by applying multiple cyclic shifts (cyclic shift) to one base sequence, and equal to the sequence length of the base sequence. These multiple sequences are orthogonal to each other.

FIGS. 5A to 5D are diagrams to show examples of the reference signal sequences of FIGS. 4A to 4D, respectively. If the bandwidth is one PRB (twelve subcarriers), the base sequence of sequence length 12 can be used as a one-symbol reference signal sequence. In the reference signals for UL grant-based transmission of FIGS. 5A and 5C, a reference signal sequence of sequence length 12 ($X_0, X_1, \ldots, X_{11}$) is mapped to each of the twelve subcarriers in one symbol. In the reference signals in UL grant-free transmission of FIGS. 5B and 5D, a reference signal sequence of sequence length 36 ($X_0, X_1, \ldots, X_{35}$) is mapped to each of the thirty-six subcarriers spanning three symbols. As a result, more code resources can be used for reference signals for UL grant-free transmission than code resources that can be used for reference signals for UL grant-based transmission.

FIGS. 6A to 6D are diagrams to show other examples of the reference signal sequences of FIGS. 4A to 4D, respectively. In the reference signals for UL grant-based transmission in FIGS. 6A and 6C, a reference signal sequence of sequence length 24 ($X_0, X_1, \ldots, X_{23}$) is mapped to each of twenty-four subcarriers spanning two symbols. Meanwhile, in the reference signals for UL grant-free transmission in FIGS. 6B and 6D, a reference signal sequence of sequence length 72 ($X_0, X_1, \ldots, X_{71}$) is mapped to each of seventy-two subcarriers spanning six symbols. In the example of FIG. 6, the sequence length of the reference signal sequence for UL grant-based transmission and the sequence length of the reference signal sequence for UL grant-free transmission are both twice the sequence lengths of the reference signals sequence of FIG. 5, so that it is possible to increase the code resources that can be used.

The combination of the reference signal sequence for UL grant-based transmission and the reference signal sequence for UL grant-free transmission is not limited to the examples in FIG. 5 and FIG. 6. For example, the reference signal sequence of FIG. 5A can be used for UL grant-based transmission, and the reference signal sequence of FIG. 6A can be used for UL grant-free transmission. Also, the reference signal sequence of FIG. 5C may be used for UL grant-based transmission, and the reference signal sequence of FIG. 6C may be used for UL grant-free transmission. In these cases, the amount of time resources for UL grant-free transmission is kept equal to the amount of time resources for UL grant-based transmission, so that the amount of code resources that can be used for reference signals in UL grant-free transmission is larger than the amount of code resources that can be used for reference signals in UL grant-based transmission.

Second Embodiment

In a second embodiment of the present invention, in reference signals for UL grant-free transmission, the amount of code resources is increased without increasing the amount of time and frequency resources.

When UL grant-free transmission is configured, the user terminal is anticipated to apply, at least to reference signals, subcarrier spacing (SCS) that is narrower than the subcarrier spacing for UL grant-based transmission. As a result, the capacity and reliability of reference signals can be improved.

FIGS. 7A to 7E are diagrams to show an example of a reference signal configuration for UL grant-based transmission and an example of a reference signal configuration for UL grant-free transmission, where the subcarrier spacing is switched.

In the grant-based transmission illustrated in FIGS. 7A to 7C, pre-configured reference subcarrier spacing is used at least in reference signals. As shown in FIG. 7C, a reference signal is mapped to one PRB with reference subcarrier spacing, over two symbols having a symbol duration corresponding to reference subcarrier spacing. For example, as shown in FIG. 7A, a CAZAC sequence of sequence length 12 ($X_0, X_1, \ldots, X_{11}$) may be repeatedly allocated to each symbol.

Also, as shown in FIG. 7B, a CAZAC sequence of sequence length 24 ($X_0, X_1, \ldots, X_{23}$) may be allocated to one PRB (twelve subcarriers) over two symbols. In this case, the amount of code resources that can be used for the reference signal of FIG. 7B will be greater than the amount of code resources that can be used for the reference signal of FIG. 7A. Also, the reference signal sequence in each symbol is a sequence of sequence length 12, ($X_0, X_1, \ldots, X_{11}$) or ($X_{12}, X_{13}, \ldots, X_{23}$), in the CAZAC sequence of sequence length 24, and therefore is no longer a CAZAC sequence. Therefore, the PAPR (Peak-to-Average Power Ratio) in the reference signal configuration of FIG. 7B is higher than when the reference signal sequence in each symbol is a CAZAC sequence of sequence length 12. In other words, as shown in FIG. 7A, the PAPR can be reduced, compared to FIG. 7B, by transmitting CAZAC sequences of sequence length 12, in each symbol in one PRB.

In the UL grant-free transmission shown in FIGS. 7D and 7E, in at least the reference signals, subcarrier spacing of ½ of the reference subcarrier spacing is configured. By this means, as shown in FIG. 7E, the bandwidth of a two-PRB reference signal (twenty-four subcarriers) is equal to the bandwidth of a one-PRB reference signal with reference subcarrier spacing, as shown in FIG. 7C. In FIG. 7E, a reference signal sequence is mapped to one symbol with a symbol duration twice the symbol duration in FIG. 7C. For example, as shown in FIG. 7D, a CAZAC sequence of sequence length 24 ($X_0, X_1, \ldots, X_{23}$) may be allocated to one symbol. In this manner, by transmitting a CAZAC sequence of sequence length 24 in one symbol, the PAPR can be reduced compared to FIG. 7B.

According to the reference signal configuration of FIG. 7D, the reference signal for UL grant-free transmission can use the same amount of time resources and the same amount of frequency resources as the reference signal for UL grant-based transmission in FIG. 7A, use a larger volume of code resources, and reduce the PAPR, compared to the reference signal for UL grant-based transmission in FIG. 7B.

In UL grant-based transmission and UL grant-free transmission, the positions of time resources and frequency resources in channel configurations are configured identically, so that the amount of information related to channel configuration, reported from the radio base station to the user terminal, can be reduced.

FIGS. 8A and 8B are diagrams to show an example of a channel configuration for UL grant-based transmission and an example of a channel configuration for UL grant-free transmission, respectively, where the subcarrier spacing is switched.

In the UL grant-based transmission shown in FIG. 8A, reference signals are mapped to four symbols in one slot. These four symbols are divided into two parts, each part comprised of two consecutive symbols (for example, symbols #0, #1, #7 and #8). Since the number of subcarriers in one PRB is twelve, so that the reference signal sequence in each symbol is, for example, a CAZAC sequence of sequence length 12 ($X_0, X_1, \ldots, X_{11}$).

In the UL grant-free transmission shown in FIG. 8B, at least in time resources in one slot that correspond to the reference signals of FIG. 8A, the subcarrier spacing is configured to be ½ of the reference subcarrier spacing. A reference signal sequence is mapped to each symbol where this subcarrier spacing is configured. Since the number of subcarriers in one PRB is twenty-four, the reference signal sequence in each symbol is, for example, a CAZAC sequence of sequence length 24 ($X_0, X_1, \ldots, X_{23}$).

FIGS. 8C and 8D are diagrams to show another example of a channel configuration for UL grant-based transmission and another example of a channel configuration for UL grant-free transmission, respectively, where the subcarrier spacing is switched.

The channel configuration for UL grant-based transmission shown in FIG. 8C is the same as in FIG. 8A.

The reference signal symbols in the channel configuration for UL grant-free transmission shown in FIG. 8D are the same as in FIG. 8B. In the UL grant-free transmission shown in FIG. 8D, even in data symbols, the subcarrier spacing is configured to ½ of the reference subcarrier spacing, and the symbol duration is doubled. According to the channel configuration for UL grant-based transmission in FIG. 8C and the channel configuration for UL grant-free transmission in FIG. 8D, the subcarrier spacing is constant within a slot, so that it is unnecessary to perform the process of switching subcarrier spacing, the transmission process at the radio base station and the receiving process at the user terminal become easy.

By combining the channel configuration for UL grant-based transmission in FIG. 8A and the channel configuration for UL grant-free transmission in FIG. 8B, or by combining the channel configuration for UL grant-based transmission in FIG. 8C and the channel configuration for UL grant-free transmission in FIG. 8D, the reference signals for UL grant-free transmission can use the same amount of time resources and the same amount of frequency resources as the reference signals for UL grant-based transmission, and can use even more code resources.

Third Embodiment

According to a third aspect of the present invention, in reference signals for UL grant-free transmission, the amount of code resources is increased by applying cyclic shifts to a base sequence and/or by multiplying a base sequence by codes, instead of by increasing the number of base sequences. Furthermore, by increasing the number of cyclic shifts and/or the number of codes, it is possible to increase the number of mutually orthogonal reference signal sequences, improve the performance of detection, and increase the number of user terminals.

Here, it is assumed that, between UL grant-based transmission and UL grant-free transmission, the channel configuration is the same and the sequence length of base sequences used for reference signals is the same. In addition, cyclic shifts are used as code resources that are assigned to each user terminal.

Figure 9B:
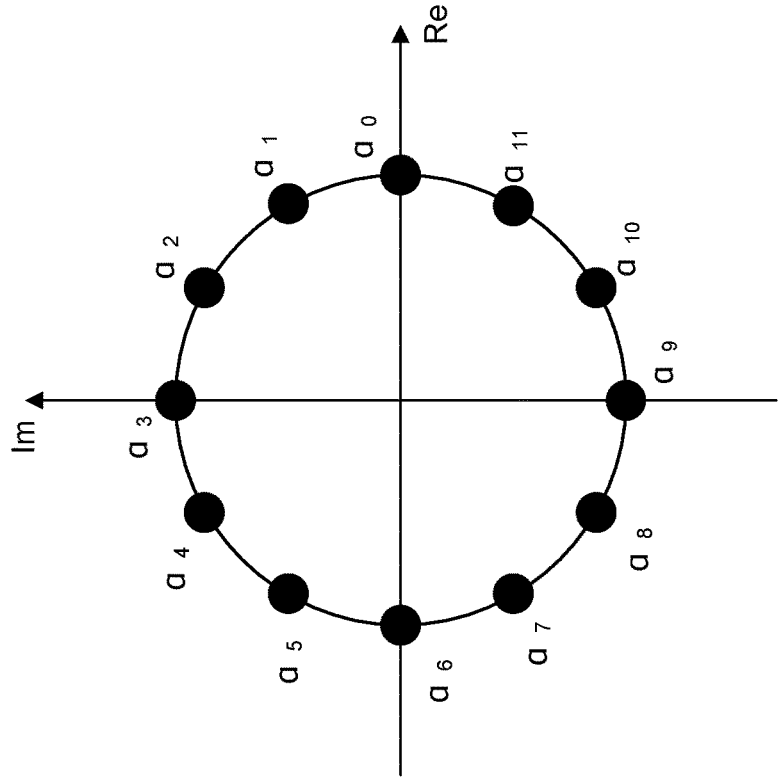
FIGS. 9A to 9B are diagrams to show an example of assigning cyclic shifts for UL grant-based transmission and an example of assigning cyclic shifts for UL grant-free transmission, respectively, where the bandwidth of reference signals is one PRB.
Figure 9A:
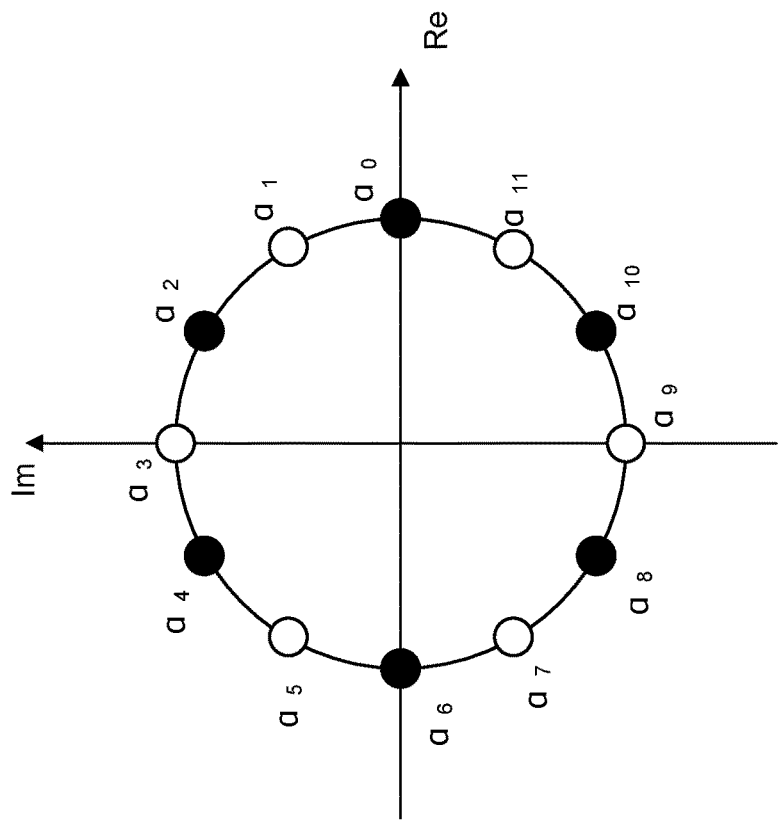

FIGS. 9A and 9B are diagrams to show an example of assigning cyclic shifts in UL grant-based transmission and an example of assigning cyclic shifts in UL grant-free transmission, respectively, when the bandwidth of reference signals is one PRB. When CAZAC sequences of sequence length 12 are transmitted, twelve phase rotation amounts (cyclic shifts) $\alpha_0$ to $\alpha_{11}$ at phase intervals of $2\pi/12$ can be used. By applying phase rotations to one base sequence, through phase rotation amounts $\alpha_0$ to $\alpha_{11}$, twelve sequences that are orthogonal to each other (with zero cross-correlation) can be obtained. These twelve sequences are identical to twelve sequences that may be obtained by performing cyclic shifts using twelve cyclic shifts.

In the UL grant-based transmission shown in FIG. 9A, among twelve cyclic shifts, six cyclic shifts that are not adjacent to each other can be assigned to maximum six user terminals. In the UL grant-free transmission shown in FIG. 9B, twelve cyclic shifts can be assigned to maximum twelve user terminals. As a result of this, the number of user terminals that can be identified in UL grant-free transmission is greater than the number of user terminals that can be identified in UL grant-based transmission. Therefore, when reference signals for UL grant-free transmission use the same amount of time resources and the same amount of frequency resources as reference signals for UL grant-based transmission, the reference signals for UL grant-free transmission can use a larger volume of code resources.

In an environment that is strongly frequency selective, the cross-correlation between sequences generated by applying adjacent cyclic shifts increases. Therefore, if the frequency selectivity is strong, reference signals for UL grant-free transmission may have lower reliability than reference signals for UL grant-based transmission.

Figure 10B:
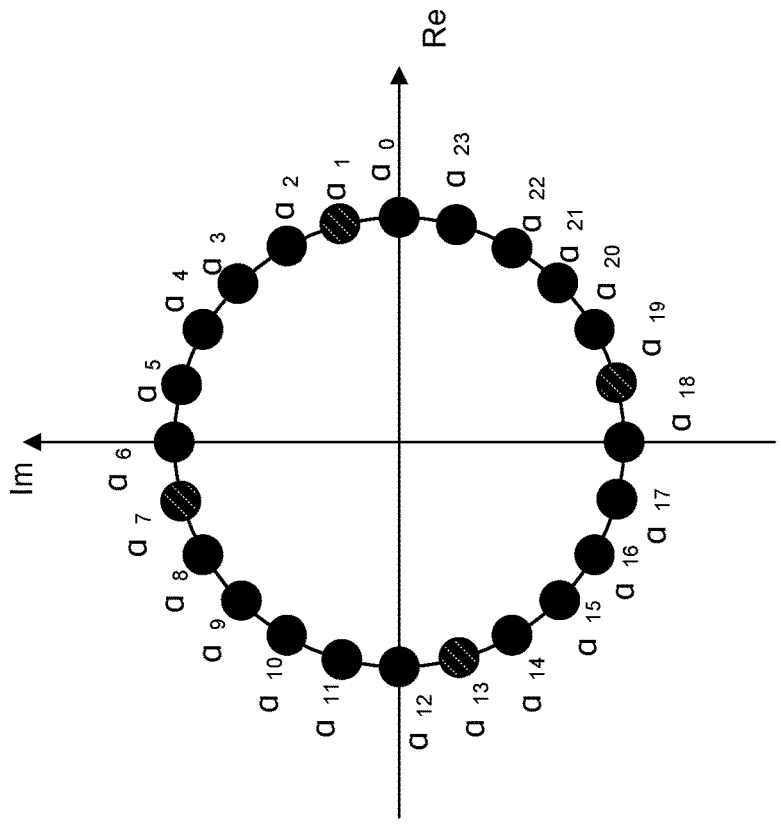
FIGS. 10A and 10B are diagrams to show an example of assigning cyclic shifts for UL grant-based transmission and an example of assigning cyclic shifts for UL grant-free transmission, respectively, where the bandwidth of reference signals is two PRBs.
Figure 10A:
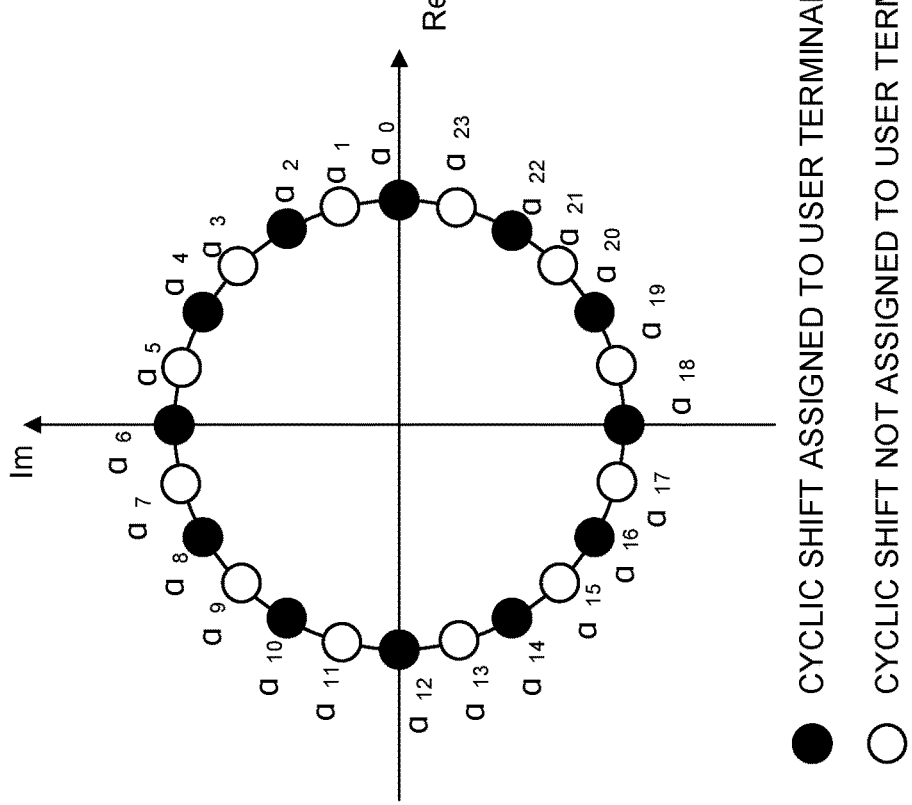

FIGS. 10A and 10B are diagrams to show an example of assigning cyclic shifts in UL grant-based transmission and an example of assigning cyclic shifts in UL grant-free transmission, respectively, where the reference signal bandwidth is two PRBs. When transmitting CAZAC sequences of sequence length 24 in two PRBs (twenty-four subcarriers), twenty-four cyclic shifts (phase rotation amounts) can be used. In this case, twenty-four phase rotation amounts $\alpha_0$ to $\alpha_{23}$ at phase intervals of $2\pi/24$ can be used.

In the UL grant-based transmission shown in FIG. 10A, out of twenty-four cyclic shifts, twelve cyclic shifts that are not adjacent to each other can be assigned to maximum twelve user terminals. In the UL grant-free transmission shown in FIG. 10B, twenty-four cyclic shifts can be assigned to maximum twenty-four user terminals. Thus, even when the reference signals for UL grant-free transmission use the same amount of time/frequency resources as the reference signals for UL grant-based transmission, the reference signals for UL grant-free transmission can use a larger volume of code resources.

When UL grant-free transmission is configured, the user terminal may anticipate improving the capacity and reliability of reference signals by using many cyclic shifts and/or codes compared to UL grant-based transmission. Also, when UL grant-free transmission is configured, the user terminal may anticipate to transmit data symbols using at least one identification information among CRC, HARQ process ID, UE-ID, PCID, VCID, beam ID, and code resource identification information. The identification information may be user terminal identification information for identifying a user terminal, or orthogonal resource identification information for identifying orthogonal resources such as code resources. The user terminal may transmit orthogonal resource identification information in a data symbol and determine the code resources of reference signals based on the orthogonal resource identification information.

Figure 11:
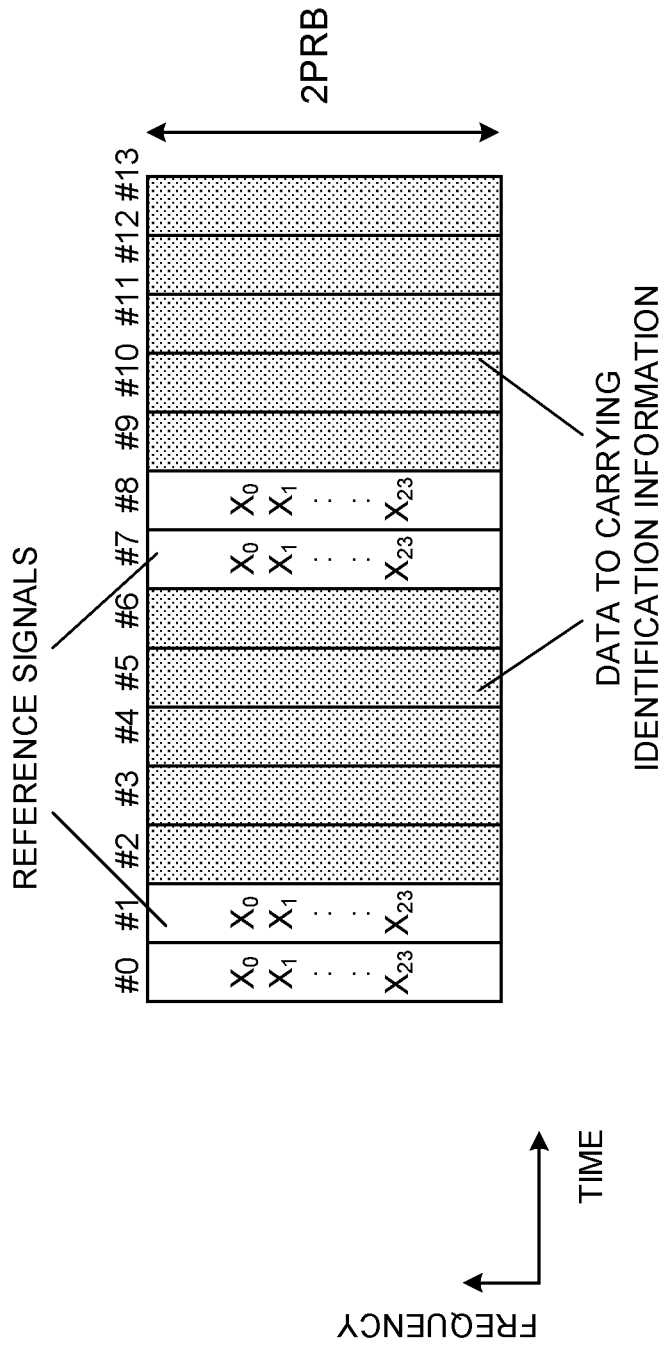
FIG. 11 is a diagram to show an example of a channel configuration for UL grant-free transmission, where the bandwidth of reference signals is two PRBs.

FIG. 11 is a diagram to show an example of a channel configuration for UL grant-free transmission when the bandwidth of reference signals is two PRBs. In this channel configuration, reference signals are configured in four symbols in one slot (for example, symbols #0, #1, #7 and #8). CAZAC sequences of sequence length 24 ($X_0, X_1, \ldots, X_{23}$) are mapped to the twenty-four subcarriers of each symbol. Since the sequence length is twenty-four, twenty-four cyclic shifts can be used. Therefore, as in FIG. 10B, twenty-four cyclic shifts can be assigned to maximum twenty-four user terminals.

This channel configuration includes reference signal symbols and data symbols. The user terminal may transmit the identification information in data symbols. The radio base station may identify the user terminal based on the identification information received.

Here, a receiving-identification operation, in which the radio base station identifies user terminals based on code resources received, will be described.

The radio base station may identify code resources by maximum likelihood detection (which may be referred to as "MLD" or "correlation detection") from received signals. Specifically, the radio base station may generate transmission signal waveforms in the same manner as user terminals do, by using replicas of code resource assigned to user terminals. In addition, the radio base station may calculate the correlation between the transmission signal waveforms thus obtained at the radio base station and the received signal waveforms as received from the user terminals, for all replicas, and the radio base station can presume that the code resource corresponding to the replica with the highest correlation has been transmitted.

If the code resources are cyclic shifts, the radio base station may multiply each element of received signal sequences (M complex-number sequences) after DFT, whose size is M, by complex conjugates of transmission signals sequences (M complex-number sequences) obtained by applying the cyclic shift for each replica to a base sequence. The radio base station may assume that the resource corresponding to the replica with the largest absolute value (or the square of the absolute value) of the sum of M sequences obtained has been sent.

Even when multiple user terminals apply different cyclic shifts to reference signals, UL data is non-orthogonal, so that, depending on how the cell is designed, it is possible to reduce the probability of simultaneous transmission by a plurality of user terminals. In this case, as shown in FIG. 9B and FIG. 10B, by assigning adjacent cyclic shifts to user terminals and using the maximum number of orthogonal codes that are likely to lose orthogonality, the number of reference signals to be multiplexed can be maximized.

In the event simultaneous transmission by a plurality of user terminals does not occur, even if orthogonality between code resources corresponding to a plurality of user terminals collapses, a given user terminal's UL grant-free transmission is not interfered with, because no other user terminal is performing UL grant-free transmission at that time. If the radio base station can specify the code resource used by the user terminal from the reference signals received, the radio base station can identify the data with high accuracy.

The radio base station may demodulate the received UL data using reference signals received, and, by performing CRC check of the UL data, specify the code resources (for example, the cyclic shifts) used for these reference signals. If the UL data does not pass CRC check, the radio base station generates reference signals using cyclic shifts adjacent to the specified cyclic shift, and the radio base station may demodulate the UL data, again, by using the generated reference signals, and perform CRC check.

Further, instead of performing CRC check, the radio base station may specify code resources using demodulated identification information.

When simultaneous transmission by a plurality of user terminals occurs, if the orthogonality between code resources corresponding to a plurality of user terminals is lost, it is difficult for the radio base station to specify the code resource used by the user terminals from the reference signals received. As a result of the receiving-identification operation, if a correlation higher than a predetermined threshold is observed from a plurality of code resources, a retransmission indication may be issued (a UL grant may be sent) to all user terminals corresponding to the code resource where the correlation higher than a predetermined threshold has been observed. Each user terminal performs UL grant-based transmission in response to the retransmission indication, so that interference can be prevented.

The user terminal may multiply reference signal and/or UL data for UL grant-free transmission by orthogonal codes (for example, orthogonal cover codes (OCCs)). When multiplying a reference signal by orthogonal codes, more code resources can be used for the reference signal, so that the number of user terminals that can be identified increases, and the performance of identifying user terminals can be improved. When multiplying UL data by orthogonal codes, it is possible to make UL data orthogonal between user terminals, so that, even when simultaneous transmission by a plurality of user terminals occurs, collision of UL data of user terminals using different orthogonal codes can be prevented.

Information on code resources such as orthogonal codes and/or cyclic shifts may be assumed to be semi-statically or dynamically reported from the radio base station to the user terminal.

In the event a collision occurs in UL grant-free transmission, the radio base station may identify the combination of colliding user terminals and identify combinations with a relatively high probability of collision (collision probability, simultaneous transmission probability). In this case, the radio base station assigns the same orthogonal code and different cyclic shifts to combinations of user terminals having a low collision probability, and the radio base station assigns different orthogonal codes to combinations of user terminals with high collision probability. Consequently, collision of UL data can be prevented. In descending order of collision probability, a predetermined number of combinations may be identified as combinations with high collision probability, and a combination in which the collision probability is higher than a predetermined threshold value may be identified. Combinations other than combinations with high collision probability may be identified as combinations with low collision probability.

Instead of orthogonal codes, resources (dimension) that make UL data orthogonal to each other, such as frequency, time, MIMO layer, beam, and sequence index, may be used. Instead of cyclic shifts, resources that make reference signals orthogonal to each other, such as frequency, time, MIMO layer, beam, and sequence index, may be used.

The radio base station may allocate resources that make reference signals orthogonal to each other and make UL data orthogonal to each other, to combinations of user terminals with high collision probability, and the radio base station may allocate resources that make reference signals orthogonal to each other but do not make UL data orthogonal to each other to combinations of user terminals with low collision probability. Thus, even when a limited amount of resources is used, the probability of UL data collision can be kept low.

Radio Communication System

Now, the structure of the radio communication system according to one embodiment of the present invention will be described below. In this radio communication system, communication is performed using one of the radio communication methods according to the herein-contained embodiments of the present invention, or a combination of these.

Figure 12:
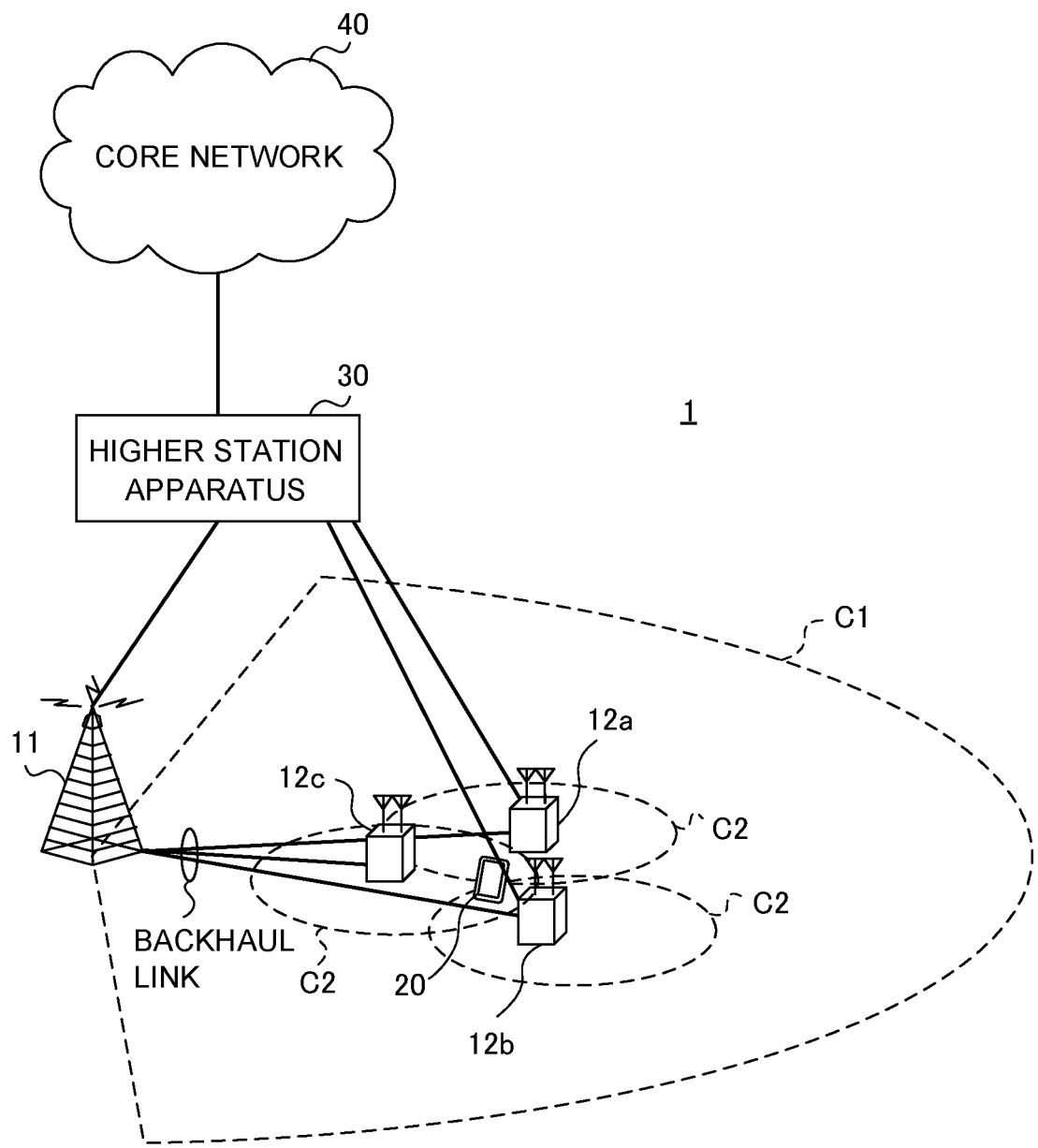
FIG. 12 is a diagram to show an example of a schematic structure of a radio communication system according to an embodiment of the present invention.

FIG. 12 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12*a* to 12*c* that are placed within the macro cell C2 and that form small cells C2, which are narrower than the macro cell C1. Also, user terminals 20 are placed in the macro cell C1 and in each small cell C2. The arrangements and numbers of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, in the PUCCH, downlink radio quality information (CQI: Channel Quality Indicator), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRSs may be referred to as "user terminal-specific reference signals (UE-specific reference signals). Also, the reference signals to be communicated are by no means limited to these.

Radio Base Station

Figure 13:
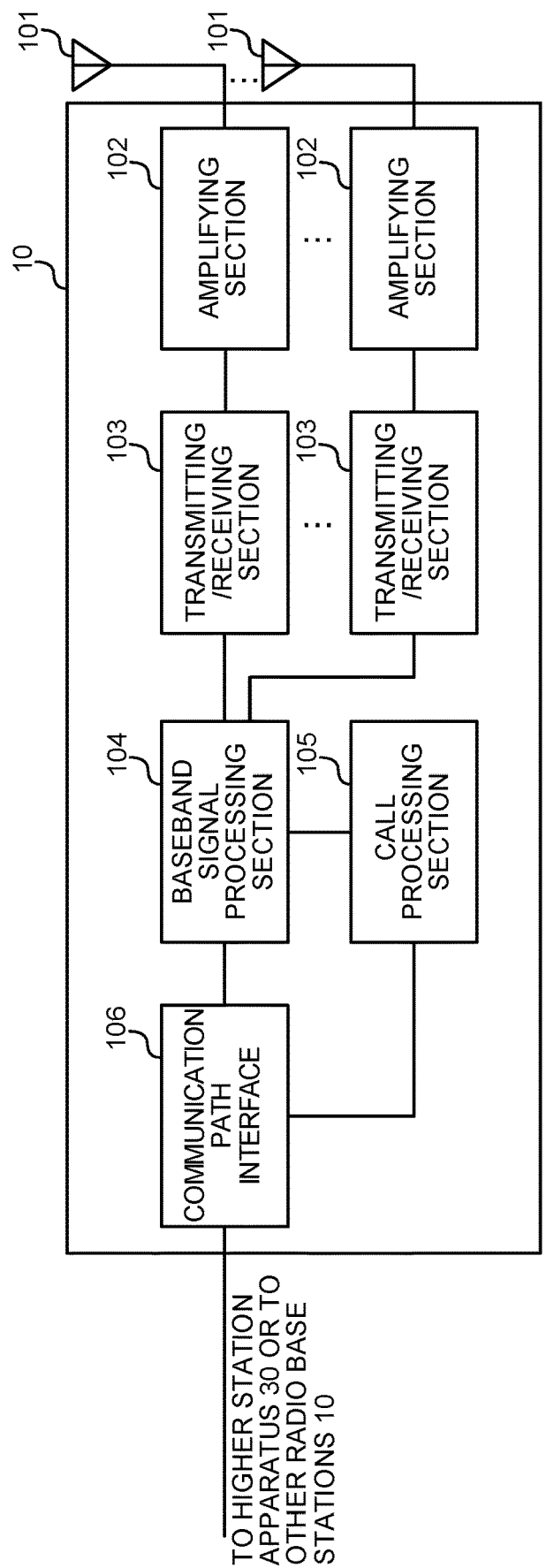
FIG. 13 is a diagram to show an example of an overall structure of a radio base station according to an embodiment of the present invention.

FIG. 13 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

In addition, the transmitting/receiving sections 103 may transmit UL transmission indications (UL grants) to the user terminals 20. In addition, the transmitting/receiving sections 103 may receive second reference signals and UL data signals transmitted from the user terminals 20 in response to the UL transmission indications. In addition, the transmitting/receiving sections 103 may receive first reference signals and UL data signal transmitted from the user terminal 20 without UL transmission indications.

Figure 14:
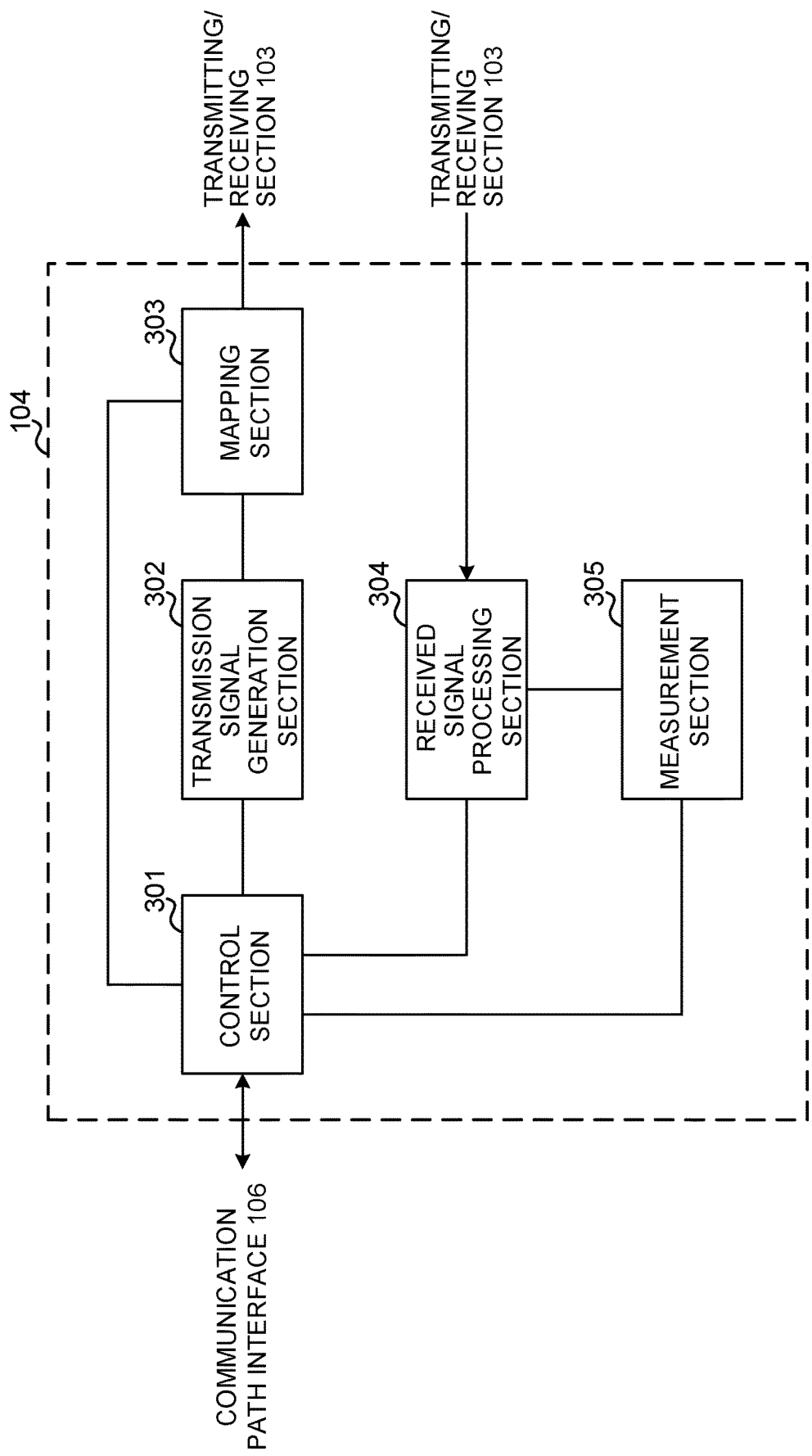
FIG. 14 is a diagram to show an example of a functional structure of a radio base station according to one embodiment of the present invention.

FIG. 14 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls scheduling (for example, resource allocation) of system information, downlink data signals (for example, signals transmitted in the PDSCH) and downlink control signals (for example, signals communicated in the PDSCH and/or the EPDCCH such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and/or other signals.

The transmission signal generation section 302 generates downlink signals (downlink control signals, downlink data signals, downlink reference signals and so on) based on indications from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on indications from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on indications from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

In addition, the control section 301 may control transmission of UL transmission indications to the user terminals 20 for UL data signal transmission (UL grant-based transmission) based on UL transmission indications (UL grants).

User Terminal

Figure 15:
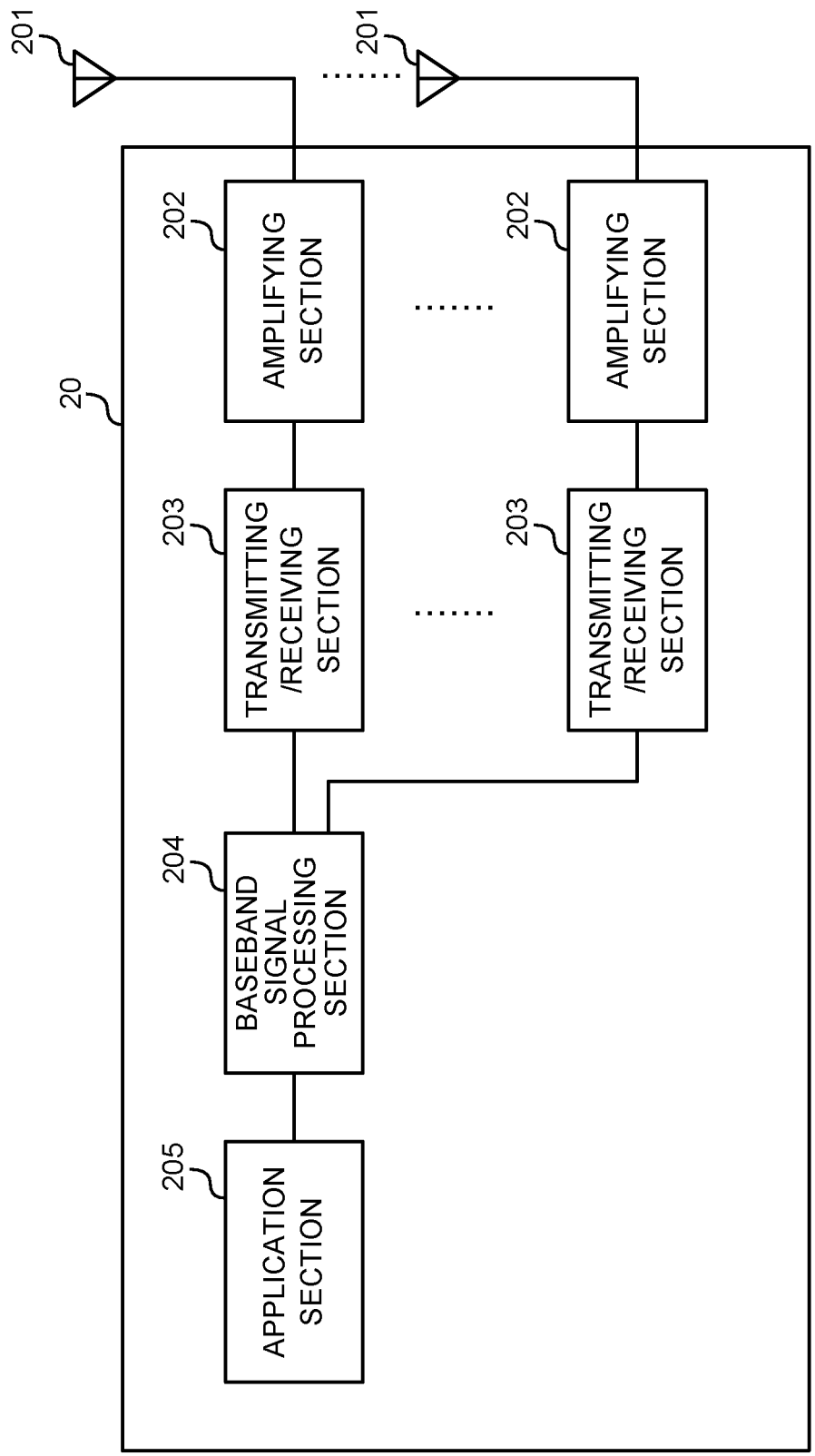
FIG. 15 is a diagram to show an example of an overall structure of a user terminal according to an embodiment of the present invention.

FIG. 15 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may transmit first reference signals and UL data signals without UL transmission indications from the radio base station. Also, the transmitting/receiving sections 203 may receive UL transmission indications from the radio base station. In addition, the transmitting/receiving sections 203 may transmit second reference signals and UL data signals based on UL transmission indications from the radio base station. Also, the transmitting/receiving sections 203 may receive information (code resources, etc.) for reserved resources and/or UL grant-free transmission.

Figure 16:
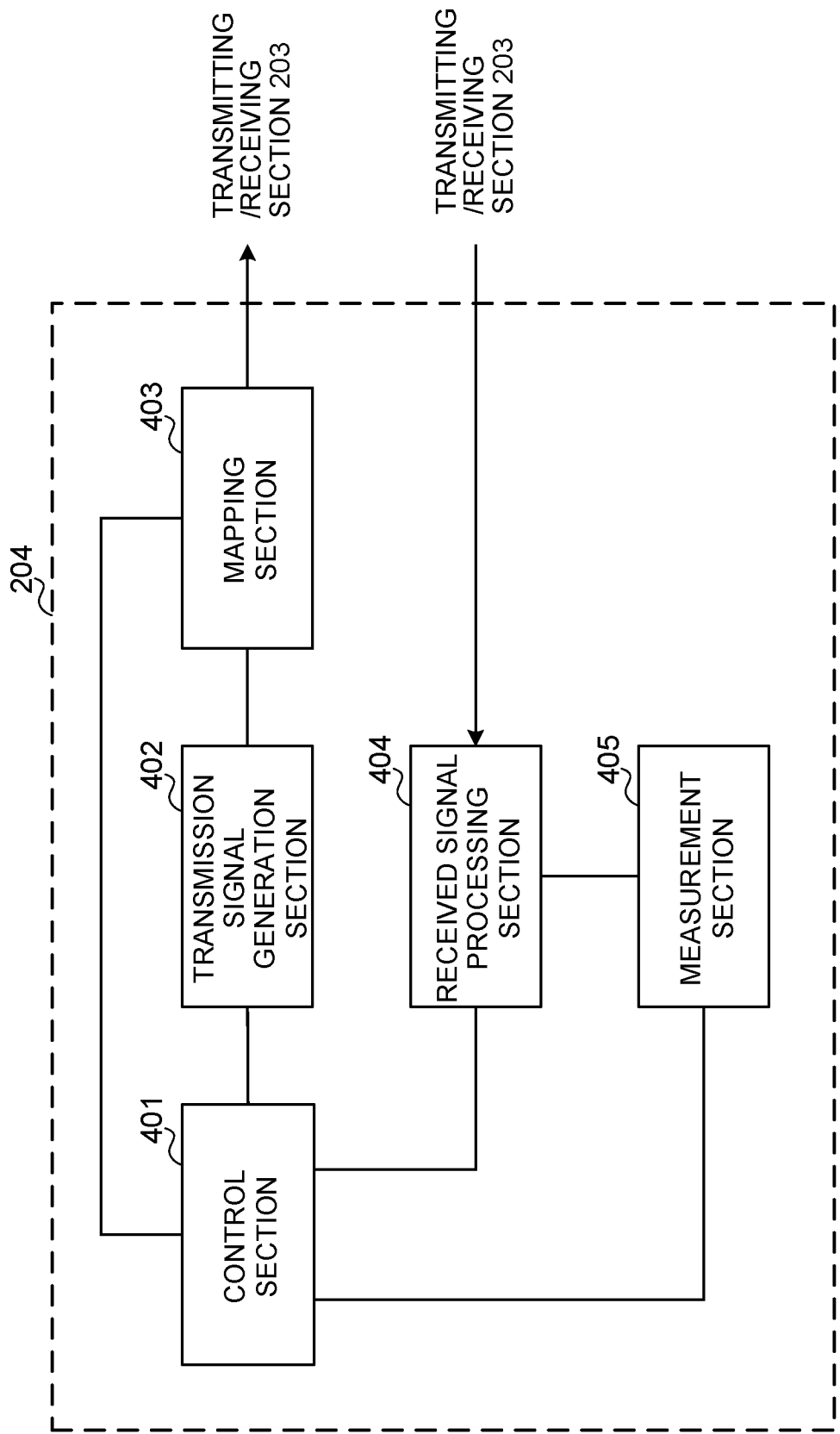
FIG. 16 is a diagram to show an example of a functional structure of a user terminal according to an embodiment of the present invention.

FIG. 16 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In addition, when various pieces of information reported from the radio base station 10 are acquired from the received signal processing section 404, the control section 401 may update the parameters used for control based on these pieces of information.

The transmission signal generation section 402 generates uplink signals (uplink control signals, uplink data signals, uplink reference signals, etc.) based on indications from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on indications from the control section 401. Also, the transmission signal generation section 402 generates uplink data signals based on indications from the control section 401. For example, when a UL grant is included in a downlink control signal that is reported from the radio base station 10, the control section 401 indications the transmission signal generation section 402 to generate an uplink data signal.

The mapping section 403 maps the uplink signals generated in the transmission signal generation section 402 to radio resources based on indications from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

In addition, the control section 401 may control generation of first reference signal using code resources associated with the user terminal. Also, the control section 401 may control generation of first reference signals by using more code resources than code resources that can be used for second reference signals, which are transmitted with UL data signals in response to UL transmission indications. Also, sequences that are used for the first reference signals may be longer than sequences used for the second reference signals. Also, the subcarrier spacing used to transmit the first reference signals may be narrower than the subcarrier spacing used to transmit the second reference signals. Also, the number of cyclic shifts that are used for the first reference signals may be greater than the number of cyclic shifts that are used for the second reference signals. In addition, the control section 401 may acquire the UL data signal by multiplying the UL data with the orthogonal code associated with the user terminal out of a plurality of orthogonal codes.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 17:
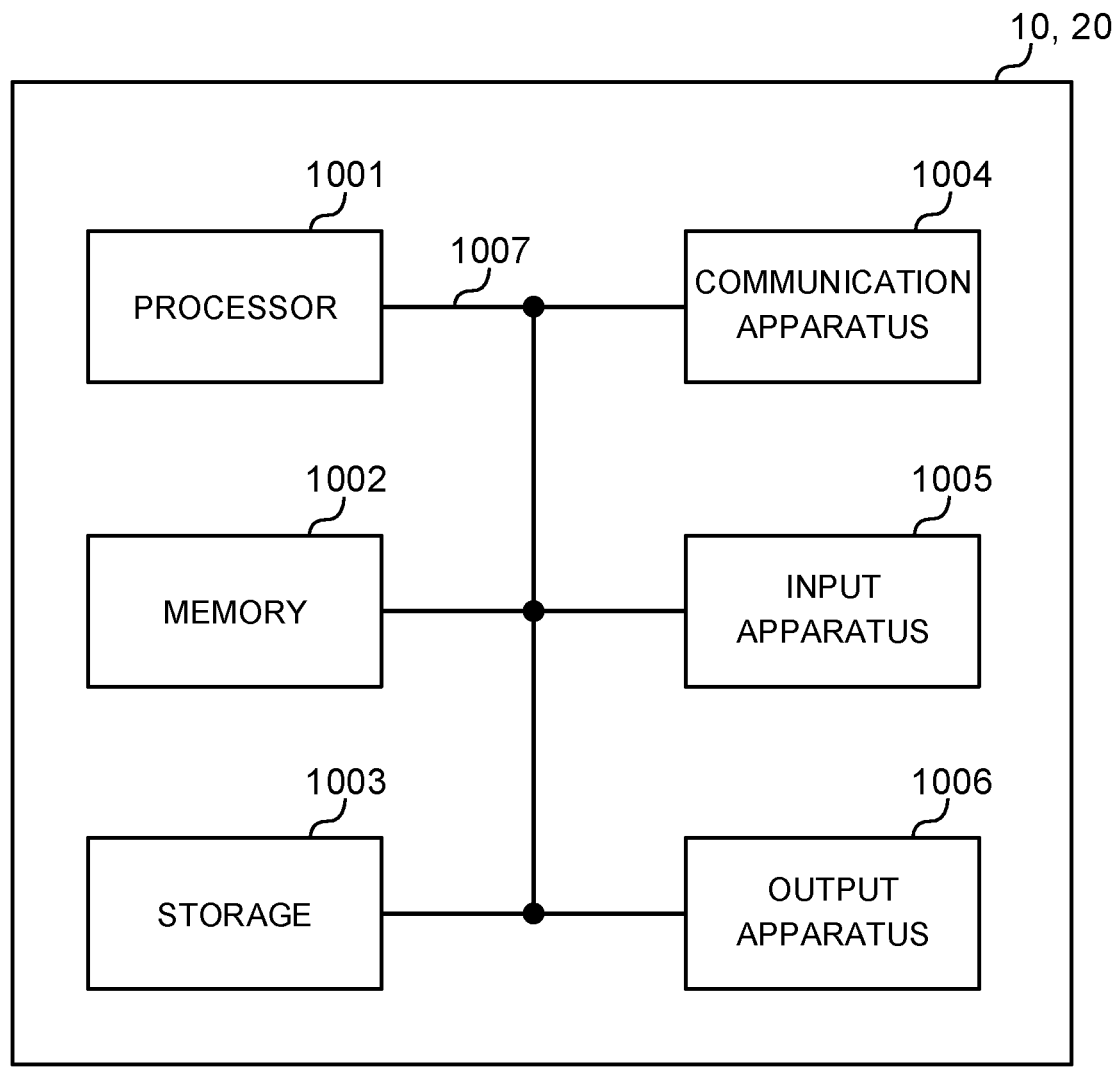
FIG. 17 is a diagram to show an example hardware structure of a radio base station and a user terminal according to an embodiment of the present invention.

For example, the radio base station, user terminals and so on according to embodiments of the present invention may function as a computer that executes the processes of the radio communication method of the present invention. FIG. 17 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling"). Also, "signals" may be "messages. A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe. Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

Also, a slot may be a time unit based on numerology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on.

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a transmitter that transmits a first preamble transmitted without a transmission indication from a base station and a second preamble transmitted based on the transmission indication from the base station;
a processor that controls to transmit the first preamble with a subcarrier spacing that is narrower than a subcarrier spacing used to transmit the second preamble; and
a receiver that receives, by higher layer signaling, an index of a base sequence of the first preamble,
wherein a number of cyclic shifts of the first preamble is greater than a number of cyclic shifts of the second preamble.

2. The terminal according to claim 1, wherein the subcarrier spacing used to the first preamble is ½ times of the subcarrier spacing used to transmit the second preamble.

3. The terminal according to claim 1, wherein a sequence length of the base sequence of the first preamble is longer than a sequence length of a base sequence of the second preamble.

4. The terminal according to claim 2, wherein a sequence length of the base sequence of the first preamble is longer than a sequence length of a base sequence of the second preamble.

5. A radio communication method comprising:
transmitting a first preamble transmitted without a transmission indication from a base station and a second preamble transmitted based on the transmission indication from the base station;
controlling to transmit the first preamble with a subcarrier spacing that is narrower than a subcarrier spacing used to transmit the second preamble;
receiving, by higher layer signaling, an index of a base sequence of the first preamble,
wherein a number of cyclic shifts of the first preamble is greater than a number of cyclic shifts of the second preamble.

6. A system comprising:
a terminal; and
a base station,
wherein:
the terminal comprises:
a transmitter that transmits a first preamble transmitted without a transmission indication from the base station and a second preamble transmitted based on the transmission indication from the base station;
a processor that controls to transmit the first preamble with a subcarrier spacing that is narrower than a subcarrier spacing used to transmit the second preamble; and
a receiver that receives, by higher layer signaling, an index of a base sequence of the first preamble; and
the base station comprises:
a receiver that receives the first preamble and the second preamble; and
a transmitter that transmits, by higher layer signaling, the index of the base sequence of the first preamble,
wherein a number of cyclic shifts of the first preamble is greater than a number of cyclic shifts of the second preamble.

* * * * *